(12) United States Patent
Schweizer et al.

(10) Patent No.: US 9,933,323 B2
(45) Date of Patent: Apr. 3, 2018

(54) SYSTEMS AND METHODS FOR MEASURING TORQUE ON ROTATING SHAFT

(71) Applicant: Honeywell International Inc., Morris Plains, NJ (US)

(72) Inventors: Pascal Schweizer, St. Martin d'Uriage (FR); Christophe Le Moing, Montbonnot (FR); Remy Chaumont, Echirolles (FR); Michael Schulz, Werne (DE); Stefan Simon, Zaberfeld (DE); Andy Mark Nicol, Lanark (GB)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/198,816

(22) Filed: Jun. 30, 2016

(65) Prior Publication Data
US 2017/0003182 A1   Jan. 5, 2017

(30) Foreign Application Priority Data

Jul. 3, 2015 (EP) .................................. 15290173
Feb. 22, 2016 (EP) .................................. 16156776

(51) Int. Cl.
*G01L 3/10* (2006.01)
(52) U.S. Cl.
CPC .............. *G01L 3/104* (2013.01); *G01L 3/101* (2013.01); *G01L 3/109* (2013.01)
(58) Field of Classification Search
CPC .......... G01L 3/104; G01L 3/101; G01L 3/109
(Continued)

(56) References Cited

U.S. PATENT DOCUMENTS 4,874,053 A    10/1989  Kimura et al.
5,239,490 A *   8/1993  Masaki .................... G01B 7/30
                                                    180/446
(Continued)

FOREIGN PATENT DOCUMENTS

EP           3112833 A2     1/2017

OTHER PUBLICATIONS

Europe Patent Application No. 16156776.3, Extended European Search Report, dated Dec. 14, 2016, 8 pages.
(Continued)

*Primary Examiner* — Harshad R Patel
*Assistant Examiner* — Octavia Hollington
(74) *Attorney, Agent, or Firm* — Conley Rose, P.C.

(57) ABSTRACT

A torque measurement system for measuring a torque acting on a rotatable shaft is provided. The torque measurement system includes a first housing portion having a first end adapted to be fixedly coupled to the rotatable shaft and a second end. The torque measurement system includes a second housing portion having a first end spaced apart from the second end of the first housing portion so as to define a gap between the first housing portion and the second housing portion. The second housing portion is adapted to be fixedly coupled to the rotatable shaft. The torque measurement system includes at least one sensor that observes at least one of the second end of the first housing portion, the first end of the second housing portion and the gap and generates sensor signals based on the observation. The sensor signals are indicative of a torque acting on the rotatable shaft.

20 Claims, 18 Drawing Sheets

(58) Field of Classification Search
USPC ....... 73/862.325, 862.331–862.338; 180/443
See application file for complete search history.

(56) References Cited

U.S. PATENT DOCUMENTS

| | | |
|---|---|---|
| 5,450,761 A | 9/1995 | Zilberman et al. |
| 5,731,529 A * | 3/1998 | Nicot ..................... G01L 3/104 |
| | | 73/862.191 |
| 6,439,065 B1 * | 8/2002 | Ooshima ............... G01L 3/1428 |
| | | 73/862.326 |
| 6,837,116 B2 | 1/2005 | Desbiolles |
| 7,219,564 B1 * | 5/2007 | May ........................ G01L 3/102 |
| | | 73/862.333 |
| 2010/0289485 A1 | 11/2010 | Eggimann |

OTHER PUBLICATIONS

Europe Patent Application No. 16156776.3, Examination Report, dated Jul. 18, 2017, 6 pages.

* cited by examiner

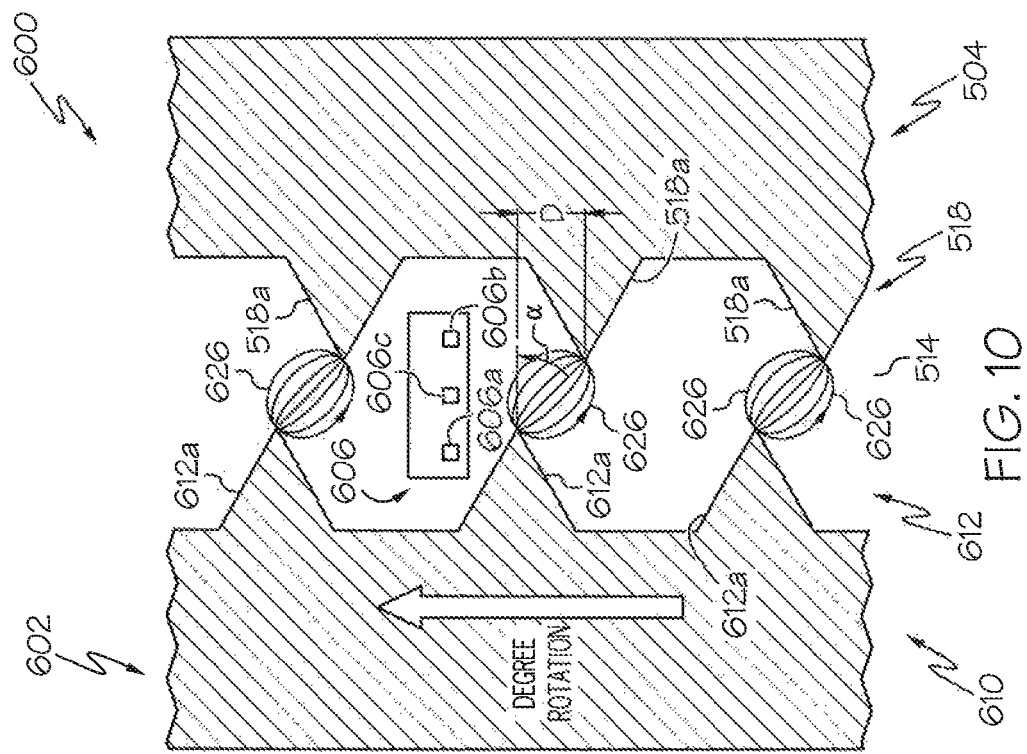
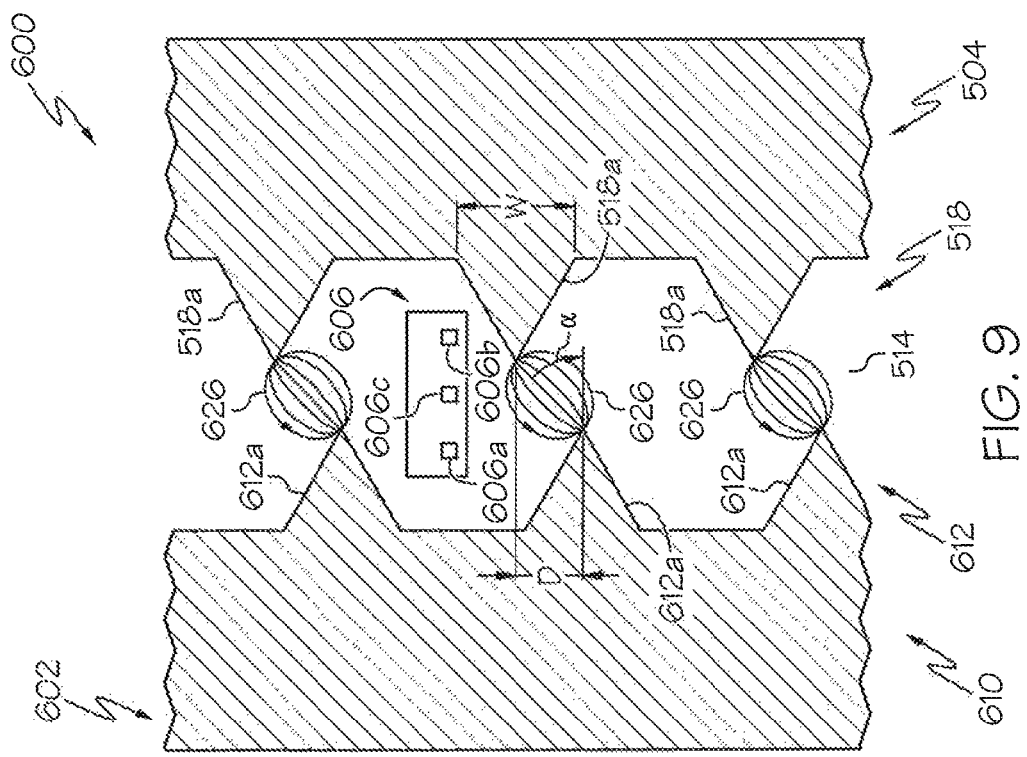

SYSTEMS AND METHODS FOR MEASURING TORQUE ON ROTATING SHAFT

CROSS-REFERENCE TO RELATED APPLICATIONS

This application claims foreign priority to European Patent Application Serial No. 16156776.3, filed on Feb. 22, 2016 with the European Patent Office, and entitled "SYSTEMS AND METHODS FOR MEASURING TORQUE ON ROTATING SHAFT", and this application claims foreign priority to European Patent Application Serial No. 15290173.2 filed on Jul. 3, 2015 with the European Patent Office, entitled "SYSTEMS AND METHODS FOR MEASURING TORQUE ON ROTATING SHAFT", both of which are incorporated herein by reference in their entirety.

TECHNICAL FIELD

The present disclosure generally relates to torque measurement systems and methods for measuring a torque, and more particularly relates to a torque measurement system for use with a rotating shaft and methods for measuring torque on a rotating shaft.

BACKGROUND

In certain instances, it is desirable to measure a torque acting on a rotating shaft. Generally, in the example of a stationary shaft, torque is measured by using strain gauges connected to the stationary shaft that converts torque into a change in electrical resistance. These strain gauges are mounted into a Wheatstone bridge, which converts the resistance change of the strain gauges into a measurable electrical output signal. With a rotating shaft, however, it is difficult to supply power to the strain gauges as the shaft rotates, and to extract and transmit the measured signal from the rotating shaft.

In certain applications, two speed sensors located at each extremity of the rotating shaft have been used to measure the torque acting on the rotating shaft. However, the speed sensors have to be placed a great distance apart in order to measure the torque acting on the shaft, which increases the cost and size of the torque measurement system.

Accordingly, it is desirable to provide an improved torque measurement system and method for measuring a torque acting on a rotating shaft, which is compact, cost effective, and is able to measure a torque acting on a short rotating shaft. Furthermore, other desirable features and characteristics of the present invention will become apparent from the subsequent detailed description and the appended claims, taken in conjunction with the accompanying drawings and the foregoing technical field and background.

SUMMARY

According to various embodiments, a torque measurement system for measuring a torque acting on a rotatable shaft is provided. The torque measurement system includes a first housing portion having a first end adapted to be fixedly coupled to the rotatable shaft and a second end. The first housing portion is adapted to be positioned coaxial with the rotatable shaft. The torque measurement system also includes a second housing portion having a first end spaced apart from the second end of the first housing portion so as to define a gap between the first housing portion and the second housing portion. The second housing portion is adapted to be fixedly coupled to the rotatable shaft. The torque measurement system includes at least one sensor that observes at least one of the second end of the first housing portion, the first end of the second housing portion and the gap and generates sensor signals based on the observation. The sensor signals are indicative of a torque acting on the rotatable shaft, and the sensor adapted to be fixedly coupled to a static frame.

A method of measuring a torque on a rotatable shaft is also provided. The method includes coupling a first housing portion coaxially about the rotatable shaft, such that a first end of the first housing portion is fixedly coupled to the rotatable shaft and the second end is free. The method also includes coupling a second housing portion fixedly to the rotatable shaft such that the second end of the first housing portion is spaced apart from the second housing portion by a gap; and positioning a sensor adjacent to the gap. The method includes observing at least one of the second end of the first housing portion, the second housing portion and the gap with the sensor; and generating sensor signals based on the observation, the sensor signals indicative of a torque acting on the rotatable shaft.

DESCRIPTION OF THE DRAWINGS

The exemplary embodiments will hereinafter be described in conjunction with the following drawing figures, wherein like numerals denote like elements, and wherein:

FIG. 9 is a schematic detail view of a portion of the torque measurement system of FIG. 8 in a first position in which no torque is applied;

FIG. 10 is a schematic detail view of a portion of the torque measurement system of FIG. 8 in a second position in which a torque is applied to the rotating shaft;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. Moreover, while the torque measurement system and method for measuring a torque acting on a rotating shaft is described herein as being used with an electrical bicycle, such as a stationary bicycle, it will be understood that the various teachings of the present disclosure may be employed with any suitable rotating shaft, such as an axle, gear shaft, etc. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term module refers to any hardware, software, firmware, electrical control component, processing logic, and/or processor device, individually or in any combination, including without limitation: application specific integrated circuit (ASIC), an electrical circuit, a processor (shared, dedicated, or group) and memory that executes one or more software or firmware programs, a combinational logic circuit, and/or other suitable components that provide the described functionality. As discussed herein, the sensors of the torque measurement system observe a rotational angle displacement or angular deflection of a free end of a cylinder that is coaxial with a rotating shaft. The rotational angle displacement or angular deflection comprises an amount of rotation or twist of the free end relative to a rotational axis of the rotating shaft, as observed by the sensor.

Figure 1:
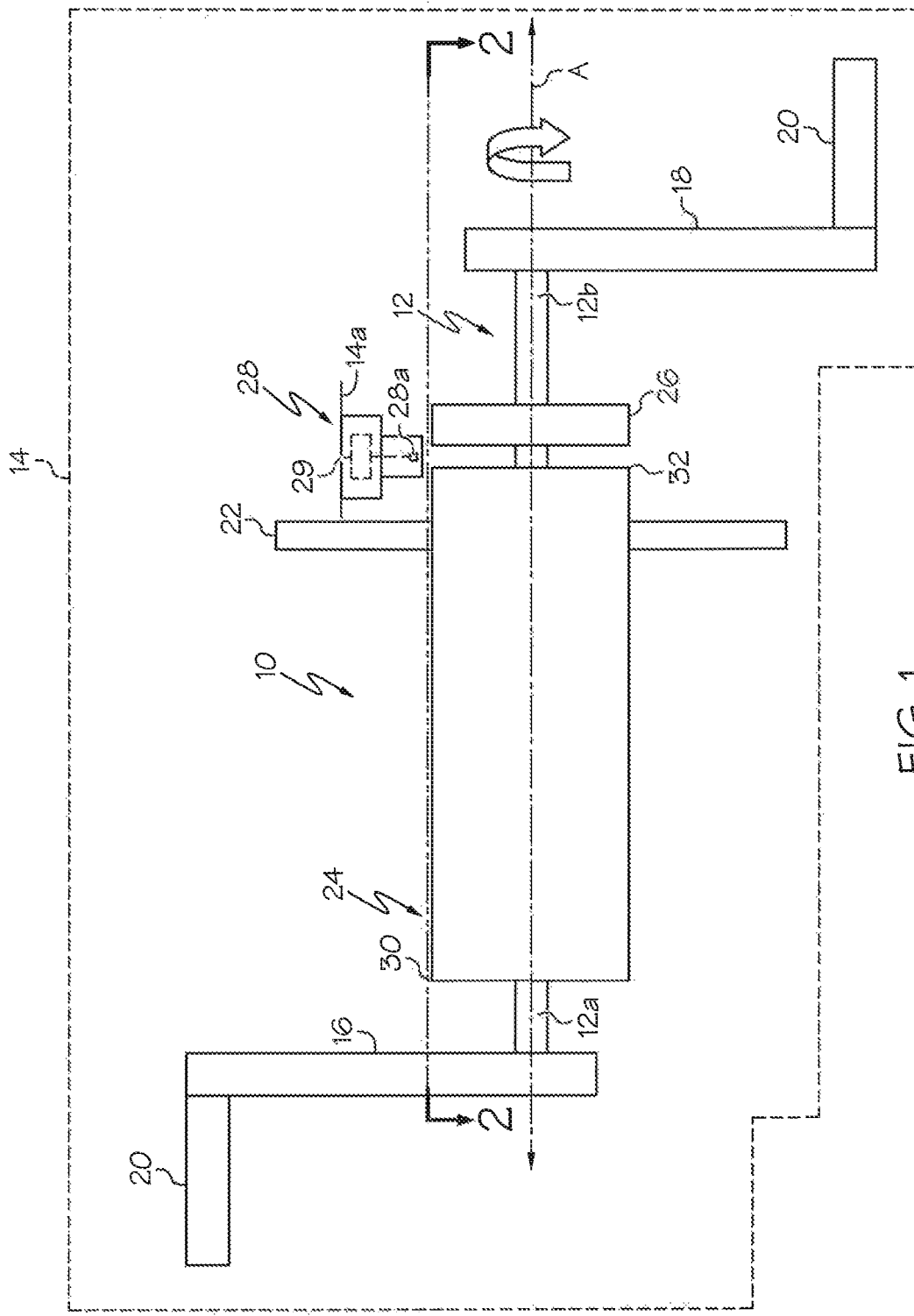
FIG. 1 is a schematic perspective illustration of a torque measurement system for use with a rotating shaft, such as a crank shaft of an electrical bicycle, in accordance with various embodiments.

With reference to FIG. 1, a torque measurement system 10 is shown. The torque measurement system 10 cooperates to form a torque sensor, which observes a torque acting on a rotatable shaft and generates sensor signals based on the observation, and a torque measurement for the torque acting on the rotatable shaft is determined based on the sensor signals. The torque measurement system 10 is coupled to a shaft 12. In one example, the shaft 12 is a pedal crank shaft of an electrical bicycle 14. It will be understood, however, that the various teachings of the present disclosure may be employed with any suitable rotatable or rotating shaft. Moreover, while the term rotating shaft is used herein, depending on the various embodiments, the shaft may or may not be actively rotating, but rather, need only be rotatable (i.e. able to be rotated) or configured to rotate about an axis upon receipt of an input. In this example, the shaft 12 is coupled to a first crank arm 16 and a second crank arm 18. Each of the first crank arm 16 and the second crank arm 18 are coupled to respective pedals 20, which receive input from an operator of the electrical bicycle 14 to rotate the shaft 12. The torque measurement system 10 includes a first housing portion 24, a second housing portion 26 and a sensor 28. A chain ring or sprocket 22 is also coupled to a second end 32 of the first housing portion 24 to transmit the torque applied to the shaft 12 to a rear wheel of the electrical bicycle 14, as is known in the art.

The first housing portion 24 has a first end 30 and a second end 32. The first housing portion 24 is coaxial with the shaft 12, and in one example, the first housing portion 24 is cylindrical, however, it will be understood that the first housing portion 24 may have any desired shape. The first end 30 of the first housing portion 24 is coupled to the shaft 12 near a first shaft end 12a of the shaft 12. The first end 30 is coupled to the shaft 12 so as to be fixed relative to the shaft 12 for rotation therewith. In one example, the first end 30 is welded to the shaft 12, but the first end 30 may be fixedly coupled to the shaft 12 using any desired technique as known to one skilled in the art.

The second end 32 of the first housing portion 24 is adjacent to a second shaft end 12b of the shaft 12. The second end 32 is generally circumferentially open, and the second end 32 is not coupled to the second shaft end 12b. Thus, only the first end 30 of the first housing portion 24 is coupled to the shaft 12, and the second end 32 is free. It should be noted that while the first housing portion 24 is illustrated herein as having a substantially solid sidewall 24a between the first end 30 and the second end 32, the first housing portion 24 may include one or more cut-outs, openings or slots to reduce the weight and/or improve the flexibility of the first housing portion 24.

Figure 2:
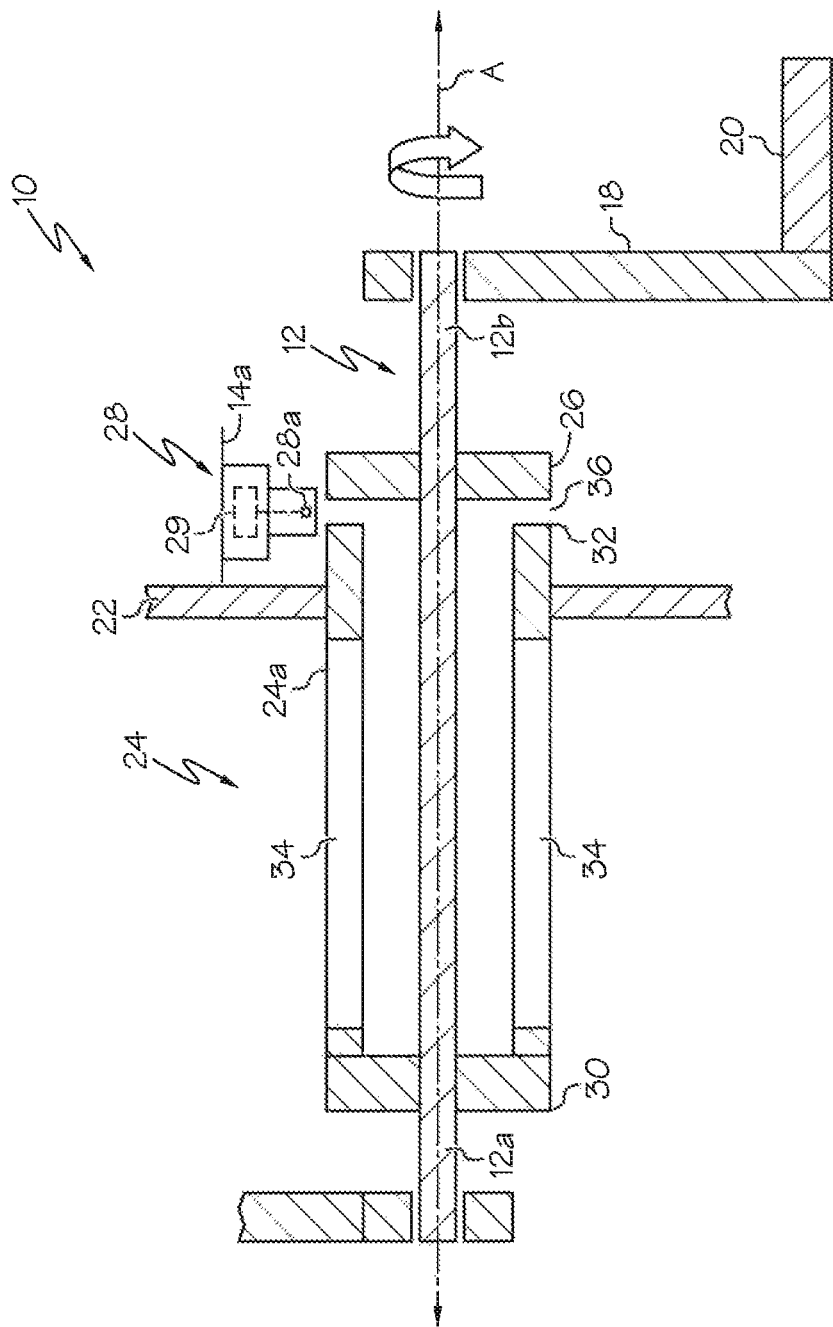
FIG. 2 is a schematic cross-sectional illustration of the torque measurement system of FIG. 1, taken along line 2-2 of FIG. 1.

With reference to FIG. 2, the first housing portion 24 includes one or more elastically deformable elements 34. In one example, the one or more elastically deformable elements 34 are coupled to the first housing portion 24 such that the second end 32 of the first housing portion 24 is flexible or is displaceable relative to the first end 30. The elastically deformable elements 34 may comprise a portion of the sidewall 24a of the first housing portion 24. The elastically deformable elements 34 may be coupled to the first housing portion 24 via any suitable technique, such as welding, mechanical fasteners, adhesives or may be integrally formed or cast with the first housing portion 24. The elastically deformable elements 34 are configured to deform upon the application of the torque to the shaft 12, thereby resulting in a rotational angle displacement or angular deflection of the first housing portion 24 at the second end 32. In other words, the elastically deformable elements 34 enable the first housing portion 24 to twist upon the application of the torque to the shaft 12. In this example, the elastically deformable elements 34 are configured to deform between about positive 4 degrees and about negative 4 degrees relative to an axis A of the shaft 12 upon the application of a torque to the shaft 12. The elastically deformable elements 34 comprise any suitable elastically deformable material, such as a metal, metal alloy, carbon fiber, polymer, etc. The elastically deformable elements 34 may also comprise a spring. As will be discussed, the sensor 28 observes the second end 32 of the first housing portion 24 and the second housing portion 26. The sensor 28 generates sensor signals based on the observed rotational angle displacement or angular deflection between the second end 32 of the first housing portion 24 and the second housing portion 26, which is directly proportional to the torque acting on the shaft 12.

The second housing portion 26 is spaced apart from the second end 32 of the first housing portion 24 by a gap 36, which comprises an air gap. The gap 36 enables movement of the second end 32 of the first housing portion 24 relative to the second housing portion 26 and is sized to cooperate with the sensor 28. The second housing portion 26 is generally annular, and is coupled to the shaft 12 near the second shaft end 12b of the shaft 12. The second housing portion 26 is fixedly coupled about the shaft 12, via welding, for example, such that the second housing portion 26 rotates with the shaft 12. The second housing portion 26 has a diameter, which may be substantially equal to a diameter of the first housing portion 24. The second housing portion 26 acts as a frame of reference for the sensor 28 to measure the rotational angle displacement or angular deflection between the second end 32 of the first housing portion 24 and the second housing portion 26.

The sensor 28 observes the second end 32 of the first housing portion 24 and the second housing portion 26. The sensor 28 generates sensor signals based on the rotational angle shift or angular deflection observed between the second end 32 of the first housing portion 24 and the second housing portion 26. The rotational angle shift or angular deflection observed by the sensor 28 is directly proportional to the torque applied or acting on the shaft 12. The sensor 28 contains at least one sensing probe 28a, and is fixed to a static structure, such as a frame 14a of the electrical bicycle 14 (FIG. 1). Generally, the sensor 28 is coupled to the static structure so as to be stationary relative to the shaft 12. The sensor 28 is coupled to the frame 14a such that the at least one sensing probe 28a is above the gap 36 or inside the gap 36 defined between the second end 32 of the first housing portion 24 and the second housing portion 26. The at least one sensing probe 28a of the sensor 28 observes and detects the rotational angle shift or angular deflection induced by the torque applied on the shaft 12. In one example, the sensor 28 includes at least one sensing probe 28a, which observes the rotational angle displacement or angular deflection between the second end 32 of the first housing portion 24 and the second housing portion 26, and generates sensor signals based thereon. In one example, the at least one sensing probe 28a comprises an optical probe, however, the at least one sensing probe 28a may comprise any suitable sensing probe that observes an angular deflection known to one skilled in the art. A module 29 or processor associated with the sensor 28 interprets the sensor signals or data from the sensor 28 and determines a torque measurement based on the sensor data, by accessing a look-up calibration table, for example. In this regard, the module 29 is in communication with a datastore or a memory, which stores a look-up calibration table that provides a torque measurement corresponding to the observed sensor signals. Based on the sensor signals or sensor data received from the at least one sensing probe 28a, the module 29 accesses the look-up table and determines the torque measurement or amount of torque acting on the rotating shaft based on the sensor signals or sensor data.

The sensor 28 may be in communication with a control module and/or a monitoring module associated with the electrical bicycle 14 over a suitable architecture that permits the transfer of power and/or data, such as a bus, to provide the sensor signals to be used for controlling an aspect of the electrical bicycle 14, such a providing an electrical motion assistance to the user of the electrical bicycle 14 that is proportional to the effort generated by the user. The sensor 28 may also be in communication with a display device associated with the electrical bicycle 14, over a suitable architecture that permits the transfer of power and/or data, such as a bus, to present the sensor data associated with the observed torque.

Figure 2A:
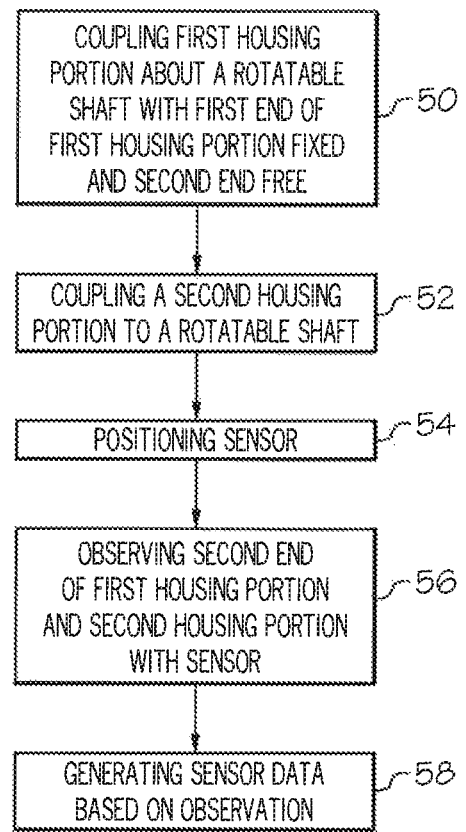
FIG. 2A is an exemplary flow chart illustrating a method of measuring torque on a rotating shaft according to various embodiments.

With reference to FIGS. 1-2A, in order to assemble the torque measurement system 10, the first housing portion 24, with the one or more elastically deformable elements 34 integrated with the first housing portion 24, is coupled about the shaft 12, such that the first housing portion 24 is coaxially aligned with the shaft 12. The first end 30 of the first housing portion 24 is fixedly coupled to the shaft 12, and the second end 32 of the first housing portion 24 remains uncoupled to the shaft 12, such that only the first end 30 is coupled for rotation with the shaft 12 (at 50 in FIG. 2A) and the second end 32 is free. The second housing portion 26 is coupled to the shaft 12, so as to be spaced apart from the second end 32 via the gap 36 (at 52 in FIG. 2A). The second housing portion 26 is fixedly coupled to the shaft 12, via welding. It should be noted, however, that the second housing portion 26 may be coupled to the shaft 12 through any suitable technique, including mechanical fasteners, or may be integrally formed with the shaft 12. The sensor 28 is fixedly coupled to the stationary structure (at 54 in FIG. 2A), such as the frame 14a, such that the at least one sensing probe 28a is positioned above, close to or within the gap 36.

As the shaft 12 rotates, the at least one sensing probe 28a observes the second end 32 of the first housing portion 24 and the second housing portion 26 (at 56 in FIG. 2A). The at least one sensing probe 28a generates sensor signals that indicate the rotational angle shift or angular deflection of the second end 32 relative to the second housing portion 26 (at 58 in FIG. 2A). The module 29 interprets the sensor signals or sensor data from the sensor 28, and may access the look-up table to determine a corresponding torque measurement. The rotational angle shift or angular deflection of the second end 32 is directly proportional to the torque acting on the shaft 12. Thus, the torque measurement system 10 provides a compact system for measuring a torque acting on the shaft 12, in which the shaft 12 may be a short shaft, such as the pedal crank shaft associated with the electrical bicycle 14.

Figure 3:
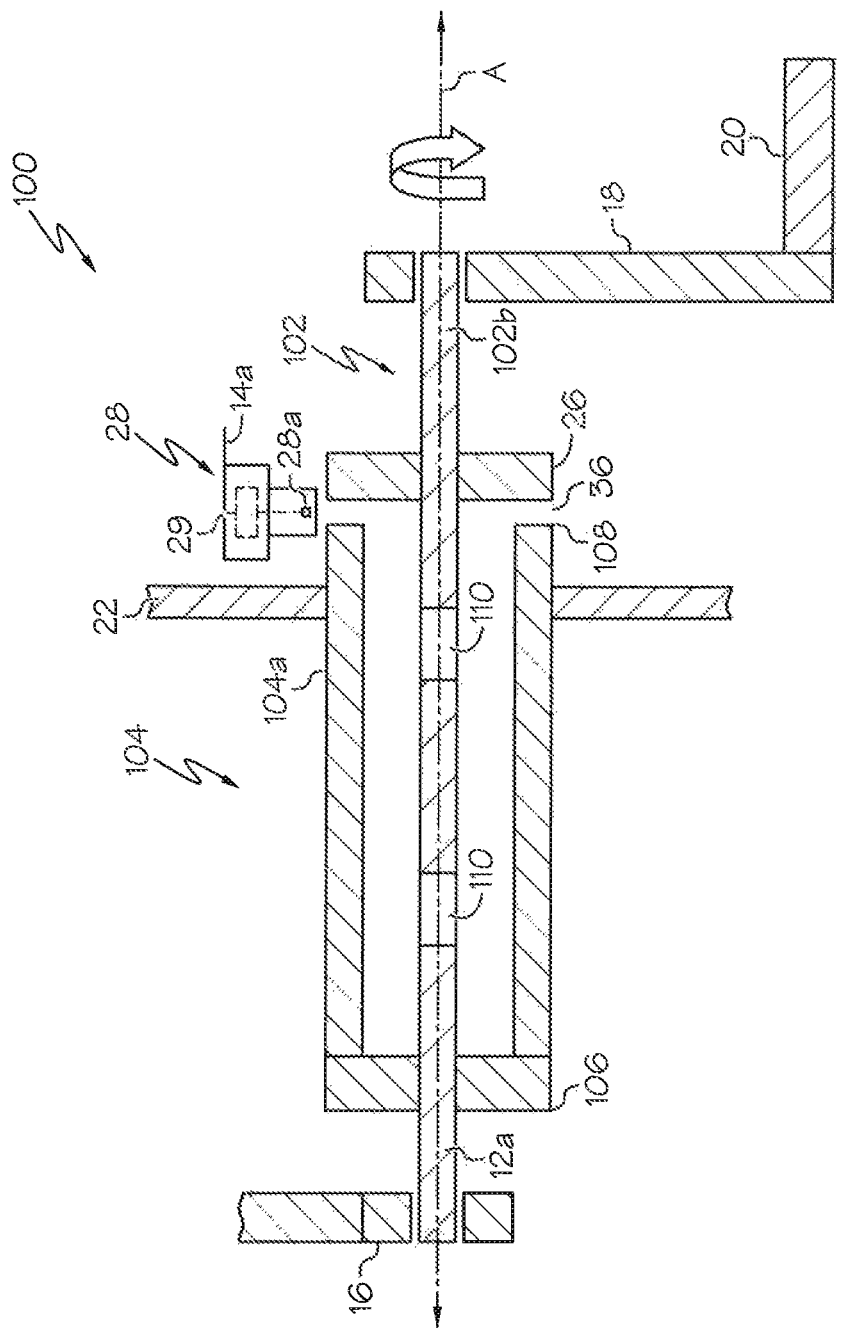
FIG. 3 is a schematic cross-sectional illustration of a torque measurement system for use with a rotating shaft, such as a crank shaft of an electrical bicycle, in accordance with various embodiments.

With reference now to FIG. 3, a cross-sectional schematic illustration of a torque measurement system 100 is shown. As the torque measurement system 100 can be similar to the torque measurement system 10 discussed with regard to FIGS. 1-2, only the differences between the torque measurement system 10 and the torque measurement system 100 will be discussed in detail herein, with the same reference numerals used to denote the same or substantially similar components. The torque measurement system 100 is coupled to a shaft 102, which in this example is the pedal crank shaft of the electrical bicycle 14 (FIG. 1). The shaft 102 is rotatable or configured to rotate upon receipt of an input. The shaft 102 is coupled to the first crank arm 16 and the second crank arm 18 to receive the input from the operator of the electrical bicycle 14 (FIG. 1). The torque measurement system 100 includes a first housing portion 104, the second housing portion 26 and the sensor 28.

The first housing portion 104 has a first end 106 and a second end 108. The first housing portion 104 is coaxial with the shaft 102, and in one example, the first housing portion 104 is cylindrical, however, it will be understood that the first housing portion 104 may have any desired shape. The first end 106 of the first housing portion 104 is coupled to the shaft 102 between a first shaft end 102a of the shaft 102 and the one or more elastically deformable elements 110 coupled to the shaft 102. The first end 106 is coupled to the shaft 102 so as to be fixed relative to the shaft 102 for rotation therewith. In one example, the first end 106 is welded to the shaft 102, but the first end 106 may be fixedly coupled to the shaft 102 using any desired technique as known to one skilled in the art.

The second end 108 of the first housing portion 104 is adjacent to a second shaft end 102b of the shaft 102. The second end 108 is generally circumferentially open, and the second end 108 is not coupled to the second shaft end 102b. Thus, only the first end 106 of the first housing portion 104 is coupled to the shaft 102 and the second end 108 is free. It should be noted that while the first housing portion 104 is illustrated herein as having a substantially solid sidewall 104a extending between the first end 106 and the second end 108, the first housing portion 104 may include one or more cut-outs, openings or slots to reduce the weight and/or improve the flexibility of the first housing portion 104.

In the example of FIG. 3, the shaft 102 includes one or more elastically deformable elements 110. In one example, the one or more elastically deformable elements 110 are coupled to the shaft 102 such that the second shaft end 102b is flexible or is displaceable relative to the first shaft end 102a resulting in a rotational angle displacement or angular deflection of the second end 108 of the first housing portion 104. The elastically deformable elements 110 may be coupled to the shaft 102 via any suitable technique, such as welding, mechanical fasteners, adhesives or may be integrally formed or cast with the shaft 102. The elastically deformable elements 110 are configured to deform upon the application of the torque to the shaft 102, thereby resulting in a rotational angle displacement or an angular deflection of the shaft 102 near the second shaft end 102b. In other words, the elastically deformable elements 110 enable the shaft 102 to twist upon the application of the torque. In this example, the elastically deformable elements 110 are configured to deform between about positive 4 degrees and about negative 4 degrees relative to an axis A of the shaft 102. The elastically deformable elements 110 comprise any suitable elastically deformable material, such as a metal, metal alloy, carbon fiber, polymer, etc. The elastically deformable elements 110 may also comprise a spring. As will be discussed, the sensor 28 observes the shaft 102 near the second shaft end 102b and the second housing portion 26. The rotational shift of the shaft 12 due to a torque being applied to the shaft 12 is transmitted to the second end 108 of the first housing portion 104. The sensor 28 generates sensor signals based on the observed rotational shift between the second end 108 of the first housing portion 104 and the second housing portion 26, which is proportional to the torque acting on the shaft 102.

The at least one sensing probe 28a of the sensor 28 generates sensor signals based on a rotational angle shift or angular deflection of the shaft 102 observed between the second end 108 of the first housing portion 104 and the second housing portion 26. The rotational angle shift or angular deflection observed by the sensor 28 is directly proportional to the torque applied or acting on the shaft 102.

As the assembly of the torque measurement system 100 is substantially similar to the assembly of the torque measurement system 10 discussed with regard to FIGS. 1-2, the assembly of the torque measurement system 100 will not be discussed in great detail herein. As the rotating shaft 102 rotates, the at least one sensing probe 28a observes the shaft 102 near the second end 108 of the first housing portion 104 and the second housing portion 26. The at least one sensing probe 28a generates sensor signals that indicate the rotational angle shift or angular deflection of the shaft 102 relative to the second housing portion 26. The module 29 interprets the sensor signals or sensor data from the sensor 28, and may access the look-up table to determine a corresponding torque measurement. The rotational angle shift or angular deflection of the shaft 102 is directly proportional to the torque acting on the shaft 102.

Figure 4:
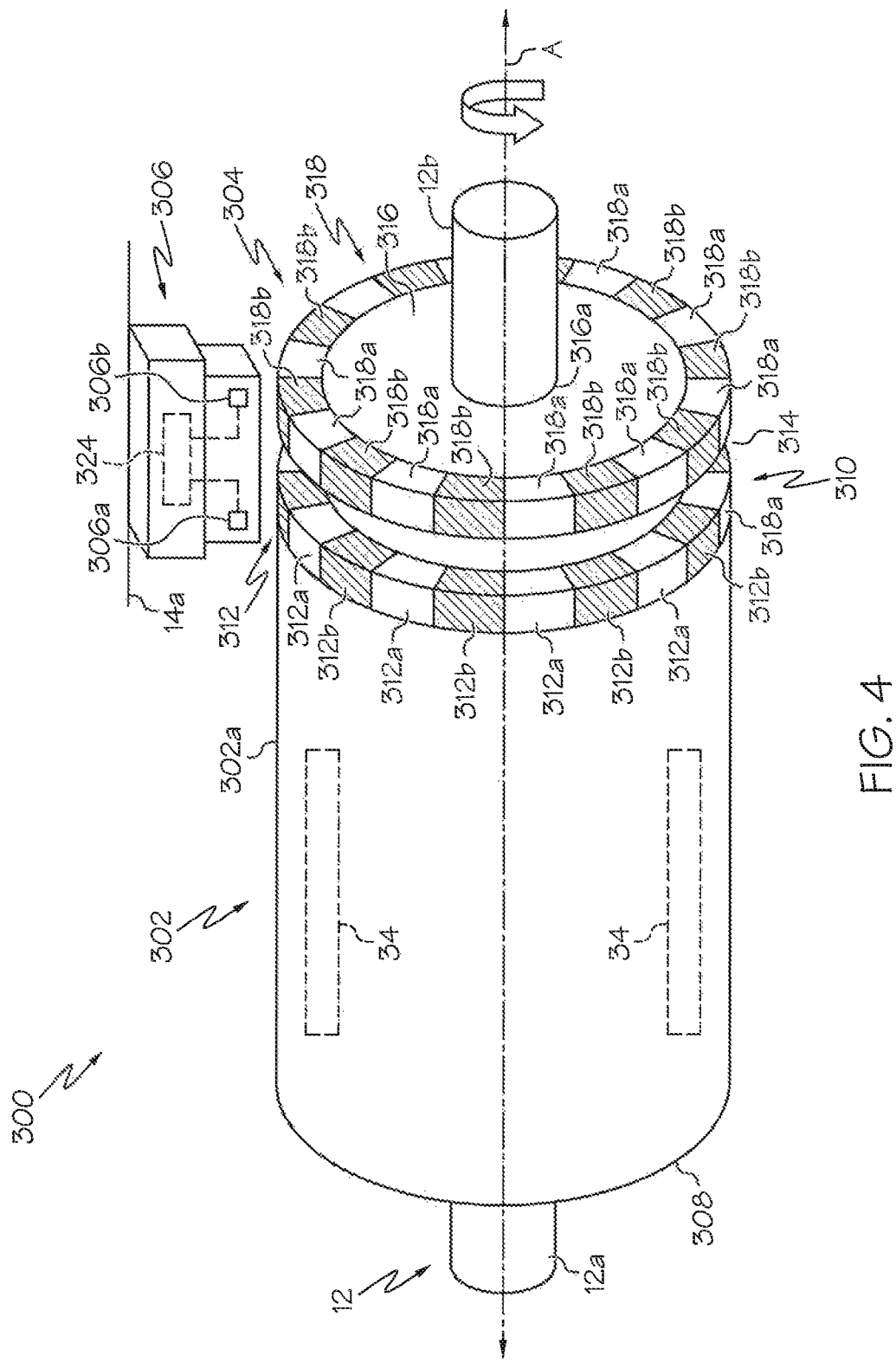
FIG. 4 is a schematic perspective illustration of a torque measurement system for use with a rotating shaft, such as a crank shaft of an electrical bicycle, in accordance with various embodiments.

With reference now to FIG. 4, a perspective schematic illustration of a torque measurement system 300 is shown. As the torque measurement system 300 can be similar to the torque measurement system 10 discussed with regard to FIGS. 1-2, only the differences between the torque measurement system 10 and the torque measurement system 300 will be discussed in detail herein, with the same reference numerals used to denote the same or substantially similar components. The torque measurement system 300 is coupled to the shaft 12, which in this example is the pedal crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). The torque measurement system 300 includes a first housing portion 302, a second housing portion 304 and a sensor 306.

The first housing portion 302 has a first end 308 and a second end 310. The first housing portion 302 is coaxial with the shaft 12, and in one example, the first housing portion 302 is cylindrical, however, it will be understood that the first housing portion 302 may have any desired shape. The first end 308 of the first housing portion 302 is coupled to the shaft 12 near a first shaft end 12a of the shaft 12. The first end 308 is coupled to the shaft 12 so as to be fixed relative to the shaft 12 for rotation therewith. In one example, the first end 308 is welded to the shaft 12, but the first end 308 may be fixedly coupled to the shaft 12 using any desired technique as known to one skilled in the art. The first housing portion 302 also includes one or more elastically deformable elements 34. In one example, the one or more elastically deformable elements 34 are integral with or embedded into the first housing portion 302, and may comprise a portion of a sidewall 302a of the first housing portion 302. The elastically deformable elements 34 are configured to deform upon the application of the torque to the shaft 12, thereby resulting in a rotation of the second end 310 of the first housing portion 302. It should be noted that while the elastically deformable elements 34 are described as being coupled to the first housing portion 302, the torque measurement system 300 may alternatively include the shaft 102 having the elastically deformable elements 110 described with regard to FIG. 3 instead of the elastically deformable elements 34 coupled to the first housing portion 302.

The second end 310 of the first housing portion 302 is adjacent to a second shaft end 12b of the shaft 12. The second end 310 is generally circumferentially open, and the second end 310 is not coupled to the second shaft end 12b. Thus, only the first end 308 of the first housing portion 302 is coupled to the shaft 12, and the second end 310 is free. It should be noted that while the first housing portion 302 is illustrated herein as having a substantially solid sidewall 302a between the first end 308 and the second end 310, the first housing portion 302 may include one or more cut-outs, openings or slots to reduce the weight and/or improve the flexibility of the first housing portion 302.

In this example, the second end 310 of the first housing portion 302 includes a multi-pole ring magnet 312. The multi-pole ring magnet 312 is coupled to the first housing portion 302 so as to extend about a perimeter or circumference of the second end 310. The multi-pole ring magnet 312 may be coupled to the second end 310 using any suitable technique, such as molding, bonding or thermal fit. In one example, the multi-pole ring magnet 312 includes a plurality of magnetic poles arranged so as to form a ring, with each adjacent magnetic pole having a different polarity (north or south). For example, the multi-pole ring magnet 312 includes a plurality of magnetic poles 312a having a north polarity and a plurality of magnetic poles 312b having a south polarity. Generally, each of the plurality of magnetic poles 312a, 312b is realized by a single permanent magnet.

The second housing portion 304 is spaced apart from the second end 310 of the first housing portion 302 by a gap 314, which comprises an air gap. The gap 314 enables movement of the second end 310 of the first housing portion 302 relative to the second housing portion 304 and is sized to cooperate with the sensor 306. The second housing portion 304 is generally annular, and is coupled to the shaft 12 near the second shaft end 12b of the shaft 12. The second housing portion 304 is fixedly coupled about the shaft 12, via welding, for example, such that the second housing portion 304 rotates with the shaft 12. The second housing portion 304 has a diameter, which may be substantially equal to a diameter of the first housing portion 302. The second housing portion 304 acts as a frame of reference for the sensor 306 to measure the rotational angle displacement or angular deflection between the second end 310 of the first housing portion 302 and the second housing portion 304.

The second housing portion 304 includes a body 316 and a second multi-pole ring magnet 318. The body 316 is generally annular, and is fixedly coupled to the shaft 12 via a throughbore 316a. The second multi-pole ring magnet 318 is coupled to the body 316 so as to extend about a perimeter or circumference of the body 316. The second multi-pole ring magnet 318 may be integrally formed with the body 316, or may be coupled to the body 316 through a suitable technique, such as molding, bonding or thermal fit. The second multi-pole ring magnet 318 comprises a plurality of magnetic poles arranged so as to form a ring, with each adjacent magnetic poles having a different polarity (north or south). For example, the second multi-pole ring magnet 318 includes a plurality of magnetic poles 318a having a north polarity and a plurality of magnetic poles 318b having a south polarity. Generally, each of the plurality of magnetic poles 318a, 318b is realized by a single permanent magnet.

Figure 4A:
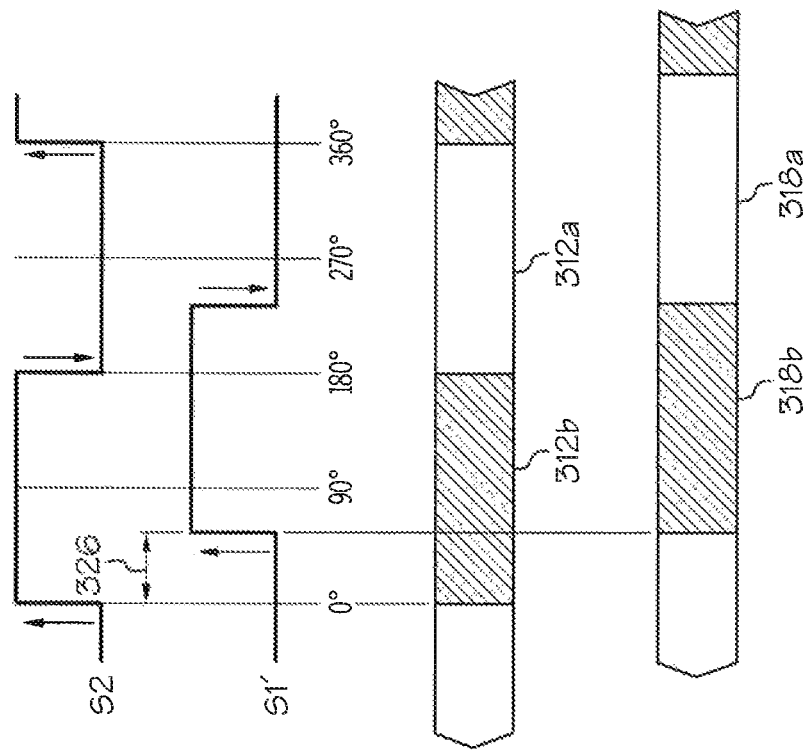
FIG. 4A is a schematic illustration of exemplary sensor data generated by a sensor associated with the torque measurement system of FIG. 4.

The multi-pole ring magnet 312 and the second multi-pole ring magnet 318 respectively generate two circular periodic magnetic field patterns around the respective one of the multi-pole ring magnet 312 and the second multi-pole ring magnet 318. The sensor 306 observes the multi-pole ring magnet 312 and the second multi-pole ring magnet 318. In this example, the sensor 306 is a magnetic speed sensor, which includes two Hall or magneto resistive speed sensor probes 306a, 306b. It should be noted, however, that the magnetic field sensor probes 306a, 306b may comprise any suitable sensor technology, including, but not limited to, Hall effect, magneto resistance, tunneling magneto resistance, giant magneto resistance, etc. The sensor probes 306a, 306b each observes a respective one of the multi-pole ring magnet 312 and the second multi-pole ring magnet 318 and generates sensor signals based thereon. The two sensor probes 306a, 306b of the sensor 306 observe and generate two periodic signals s1 and s2 during the rotation of the shaft 12. As a torque is applied to the shaft 12, the second end 310 rotates or deflects due to the elastically deformable elements 34, and the sensor probes 306a, 306b generate two periodic sensor signals, the periodic signal generated from the sensor probe 306a is shifted compared to the periodic signal generated from the sensor probe 306b when there is a torque applied to the shaft 12. As illustrated in FIG. 4A, a measure of a phase shift 326 between the two periodic signals s1 and s2 generated by the sensor probes 306a, 306b when a torque is applied to the shaft 12 is a direct measure of the rotational angle shift (generally about positive 4 degrees to about negative 4 degrees) between the second end 310 of the first housing portion 302 and the second housing portion 304, which is directly proportional to the torque applied on the shaft 12. The comparison between the two signals generated by the sensor probes 306a, 306b may be performed by a module 324 or processor located within a housing of the sensor 306 to determine a torque measurement, via a look up calibration table, for example, or the two signals generated by the sensor probes 306a, 306b may be output to an external module or processor in communication with the sensor probes 306a, 306b over a suitable architecture that facilitates the transfer of data and/or power. In one example, the module 324 interprets the sensor signals or sensor data from the sensor probes 306a, 306b of the sensor 306 and determines the phase shift 326. Based on the determined phase shift 326, the module 324 may access the look up table, which may be stored in a datastore in communication with the module 324 or in a memory associated with the module 324, and determines the torque measurement based on the determined phase shift 326.

The sensor 306 is fixed to a static structure, such as the frame 14a of the electrical bicycle 14 (FIG. 1). Generally, the sensor 306 is coupled to the static structure so as to be stationary relative to the shaft 12. The sensor 306 is coupled to the frame 14a such that the sensor probes 306a, 306b are aligned with a respective one of the multi-pole ring magnet 312 and the second multi-pole ring magnet 318. The applied torque induces an angular deflection of the second end 310 relative to the second housing portion 304. The multi-pole ring magnet 312 and the second multi-pole ring magnet 318 are attached to a respective one of the second end 310 and the second housing portion 304. The angular deflection of the second end 310 can be detected with the use of the magnetic sensor 306 to observe the phase shift 326 in two or more independent sensor probes 306a, 306b located in the sensor 306 observing the two periodic magnetic field patterns associated with the second end 310 and the second housing portion 304 when the shaft 12 rotates. Stated another way, the sensor 306 observes a shift in the magnetic field as indicated by the phase shift 326 in the periodic signals generated by the sensor probes 306a, 306b when a torque is applied to the shaft 12, which is proportional to the angular deflection of the second end 310 of the first housing portion 302 when a torque is applied to the shaft 12. Thus, the sensor signals generated by observing the shift in the magnetic field with the sensor 306 are indicative of a torque applied to the rotatable shaft 12. The sensor 306 may be in communication with a control module and/or a monitoring module associated with the electrical bicycle 14 over a suitable architecture that permits the transfer of power and/or data, such as a bus, to provide the sensor signals to be used for controlling an aspect of the electrical bicycle 14, such as providing an electrical motion assistance to the user that is proportional to the effort generated by the user of the electrical bicycle 14. The sensor 306 may also be in communication with a display device associated with the electrical bicycle 14, over a suitable architecture that permits the transfer of power and/or data, such as a bus, to present the sensor data associated with the observed torque.

With reference to FIG. 4, as the assembly of the torque measurement system 300 is substantially similar to the assembly of the torque measurement system 10 discussed with regard to FIGS. 1-2, the assembly of the torque measurement system 300 will not be discussed in great detail herein. As the shaft 12 rotates, the sensor probes 306a, 306b observe the respective one of the multi-pole ring magnet 312 and the second multi-pole ring magnet 318. As a torque is applied to the shaft 12, the second end 310 of the first housing portion 302 rotates relative to the second housing portion 304, which results in an angular shift in the periodic magnetic field observed by the sensor probe 306a versus the periodic magnetic field observed by the sensor probe 306b. The shift in the magnetic field observed by the sensor probe 306a results in the phase shift 326 in the periodic signal generated by the sensor probe 306a compared to the periodic signal generated by the sensor probe 306b. The phase shift 326 between the periodic signal of the sensor probe 306a and the periodic signal of the sensor probe 306b is directly proportional to the torque acting on the shaft 12. The module 324 interprets the sensor signals or sensor data from the sensor probes 306a, 306b of the sensor 306 and determines the phase shift 326. Based on the determined phase shift 326, the module 324 may access the look up table and determine the torque measurement based on the determined phase shift 326.

Figure 5:
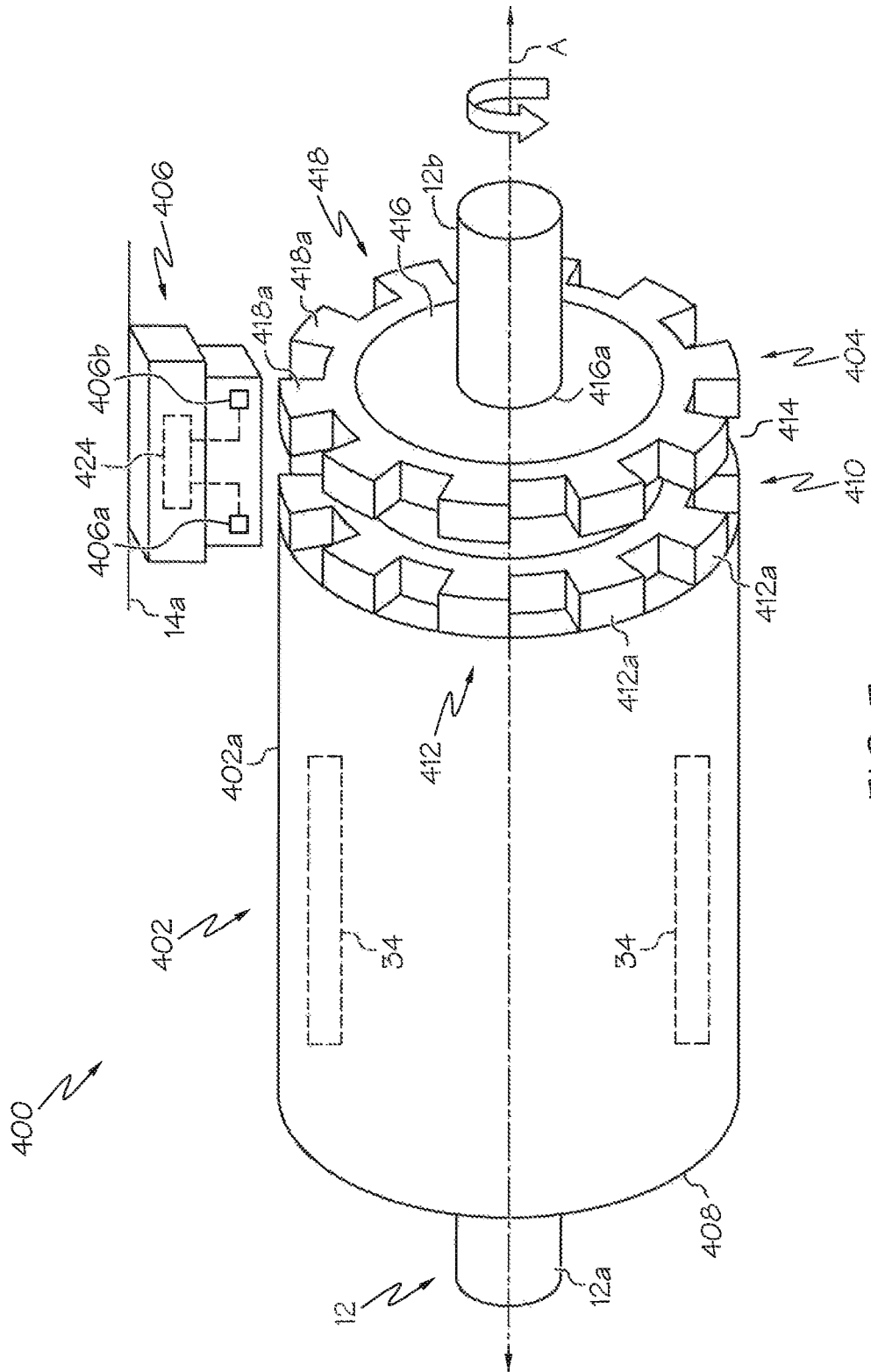
FIG. 5 is a schematic perspective illustration of a torque measurement system for use with a rotating shaft, such as a crank shaft of an electrical bicycle, in accordance with various embodiments.

With reference now to FIG. 5, a perspective schematic illustration of a torque measurement system 400 is shown. As the torque measurement system 400 can be similar to the torque measurement system 300 discussed with regard to FIG. 4, only the differences between the torque measurement system 300 and the torque measurement system 400 will be discussed in detail herein, with the same reference numerals used to denote the same or substantially similar components. The torque measurement system 400 is coupled to the shaft 12, which in this example is a crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). The torque measurement system 400 includes a first housing portion 402, a second housing portion 404 and a sensor 406.

The first housing portion 402 has a first end 408 and a second end 410. The first housing portion 402 is coaxial with the shaft 12, and in one example, the first housing portion 402 is cylindrical, however, it will be understood that the first housing portion 402 may have any desired shape. The first end 408 of the first housing portion 402 is coupled to the shaft 12 near a first shaft end 12a of the shaft 12. The first end 408 is coupled to the shaft 12 so as to be fixed relative to the shaft 12 for rotation therewith. In one example, the first end 408 is welded to the shaft 12, but the first end 408 may be fixedly coupled to the shaft 12 using any desired technique as known to one skilled in the art. The first housing portion 402 also includes one or more elastically deformable elements 34. In one example, the one or more elastically deformable elements 34 are integral with or embedded into the first housing portion 402, and may comprise a portion of the sidewall 402a of the first housing portion 402. The elastically deformable elements 34 are configured to deform upon the application of the torque to the shaft 12, thereby resulting in a rotation of the second end 410 of the first housing portion 402. It should be noted that while the elastically deformable elements 34 are described as being coupled to the first housing portion 402, the torque measurement system 400 may alternatively include the shaft 102 having the elastically deformable elements 110 described with regard to FIG. 3 instead of the elastically deformable elements 34 coupled to the first housing portion 402.

The second end 410 of the first housing portion 402 is adjacent to the second shaft end 12b of the shaft 12. The second end 410 is generally circumferentially open, and the second end 410 is not coupled to the second shaft end 12b. Thus, only the first end 408 of the first housing portion 402 is coupled to the shaft 12, and the second end 410 is free. It should be noted that while the first housing portion 402 is illustrated herein as having a substantially solid sidewall 402a between the first end 408 and the second end 410, the first housing portion 402 may include one or more cut-outs, openings or slots to reduce the weight and/or improve the flexibility of the first housing portion 402.

In this example, the second end 410 of the first housing portion 402 includes a first periodic shape profile, which in this example, is a first plurality of teeth 412. It will be understood that the first periodic shape profile may comprise any suitable periodic or repeating pattern of shapes, and thus, the use of teeth is merely exemplary. The first plurality of teeth 412 are coupled to the first housing portion 402 so as to extend about a perimeter or circumference of the second end 410 in a specific, defined periodic shape profile pattern. In this regard, each tooth 412a of the first plurality of teeth 412 are arranged about the perimeter of the second end 410 with a unique pattern, which may include one tooth 412a being spaced apart from another tooth 412a at a distance that is different than a reminder of the first plurality of teeth 412. It should be noted, however, that the teeth 412a may be arranged in any suitable defined pattern, which is observable by the sensor 406. The first plurality of teeth 412 may be integrally formed with the second end 410, or may be coupled to the second end 410 through a suitable technique, such as welding. The first plurality of teeth 412 are observable by the sensor 406.

The second housing portion 404 is spaced apart from the second end 410 of the first housing portion 402 by a gap 414, which comprises an air gap. The gap 414 enables movement of the second end 410 of the first housing portion 402 relative to the second housing portion 404, and is sized to cooperate with the sensor 406. The second housing portion 404 is generally annular, and is coupled to the shaft 12 near the second shaft end 12b of the shaft 12. The second housing portion 404 is fixedly coupled about the shaft 12, via welding, for example, such that the second housing portion 404 rotates with the shaft 12. The second housing portion 404 has a diameter, which may be substantially equal to a diameter of the first housing portion 402. The second housing portion 404 acts as a frame of reference for the sensor 406 to measure the rotational angle displacement or angular deflection between the second end 410 of the first housing portion 402 and the second housing portion 404.

The second housing portion 404 includes a body 416 and a second periodic shape profile, which in this example is a second plurality of teeth 418. It will be understood that the first periodic shape profile may comprise any suitable periodic or repeating pattern of shapes, and thus, the use of teeth is merely exemplary. The body 416 is generally annular, and is fixedly coupled to the shaft 12 via a throughbore 416a. The second plurality of teeth 418 is coupled to the body 416 so as to extend about a perimeter or circumference of the body 416 in a specific, defined periodic shape profile pattern. In this regard, each tooth 418a of the first plurality of teeth 418 are arranged about the perimeter of the body 416 with a unique pattern, which may include one tooth 418a being spaced apart from another tooth 418a at a distance that is different than a reminder of the second plurality of teeth 418. It should be noted, however, that the teeth 418a may be arranged in any suitable defined pattern, which is observable by the sensor 406. The second plurality of teeth 418 may be integrally formed with the body 416, or may be coupled to the body 416 through a suitable technique, such as welding. The second plurality of teeth 418 are observable by the sensor 406.

The sensor 406 observes the first periodic shape profile, such as the first plurality of teeth 412 and the second periodic shape profile, such as the second plurality of teeth 418. Generally, the first plurality of teeth 412 and the second plurality of teeth 418 are composed of a ferromagnetic conductive material, such as a metal or metal alloy. In this example, the sensor 406 is an optical probe, which includes two sensor probes 406a, 406b that each are optical sensing probes as known to one of skill in the art. It should be noted, however, that the sensor probes 406a, 406b may comprise any suitable sensing technology known to one of skill in the art, including but not limited to, inductive sensor probes, back biased Hall effect sensor probes, optical switches, back biased magneto resistance sensor probes, variable reluctance sensor probes, or magnetic sensing probes. The sensor probes 406a, 406b each observes a respective one of the first plurality of teeth 412 and the second plurality of teeth 418 and generate sensor signals based thereon. Alternatively, the sensor 406 may comprise two sensor probes 406a, 406b that are magnetic, and propagate a magnetic field through the ferromagnetic conductive first plurality of teeth 412 and second plurality of teeth 418. As a further alternative, the sensor 406 may comprise two sensor probes 406a, 406b that are each inductive sensing probes, which include a coil or induction loop.

With reference to FIG. 5, the two sensor probes 406a, 406b of the sensor 406 observe and generate two periodic signals s1 and s2 during the rotation of the shaft 12. As a torque is applied to the shaft 12, the second end 410 rotates or deflects due to the elastically deformable elements 34, and with reference to FIG. 5A, the sensor probe 406a generates a sensor signal s1', the period of which is shifted at 426 compared to the periodic signal generated when there is no torque applied to the shaft 12. A measure of the phase shift 426 between the two periodic signals s1' and s2 generated by the sensor probes 406a, 406b when a torque is applied to the shaft 12 is a direct measure of the rotational angle shift (generally about positive 4 degrees to about negative 4 degrees) between the second end 410 of the first housing portion 402 and the second housing portion 404, which is directly proportional to the torque applied on the shaft 12. The applied torque induces an angular deflection of the second end 410 relative to the second housing portion 404. The synchronized ferrous first plurality of teeth 412 and the second plurality of teeth 418 are attached to a respective one of the second end 410 and the second housing portion 404. The angular deflection of the second end 410 relative to the second housing portion 404 can be detected with the sensor 406, which observes the phase shift 426 in two or more independent sensor probes 406a, 406b located in the sensor 406 observing the two periodic shaped patterns of the first plurality of teeth 412 and the second plurality of teeth 418 associated with the second end 410 and the second housing portion 404 when the shaft 12 rotates. With reference to FIG. 5, the comparison between the two signals s1' and s2 generated by the sensor probes 406a, 406b may be performed by a module 424 or processor located within a housing of the sensor 406 to determine a torque measurement, via a look-up calibration table, for example, or the two signals generated by the sensor probes 406a, 406b may be output to an external module or processor in communication with the sensor probes 406a, 406b over a suitable architecture that facilitates the transfer of data and/or power. In one example, the module 424 interprets the sensor signals or sensor data from the sensor probes 406a, 406b of the sensor 406 and determines the phase shift 426. Based on the determined phase shift 426, the module 424 may access the look up table, which may be stored in a datastore in communication with the module 424 or in a memory associated with the module 424, and determine the torque measurement based on the determined phase shift 426.

The sensor 406 is fixed to a static structure, such as the frame 14a of the electrical bicycle 14 (FIG. 1). Generally, the sensor 406 is coupled to the static structure so as to be stationary relative to the shaft 12. The sensor 406 is coupled to the frame 14a such that the sensor probes 406a, 406b are aligned with a respective one of the first plurality of teeth 412 and the second plurality of teeth 418. The sensor 406 may be in communication with a control module and/or a monitoring module associated with the electrical bicycle 14 over a suitable architecture that permits the transfer of power and/or data, such as a bus, to provide the sensor signals to be used for controlling an aspect of the electrical bicycle 14, such as providing an electrical motion assistance to the user that is proportional to the effort generated by the user of the electrical bicycle 14. The sensor 406 may also be in communication with a display device associated with the electrical bicycle 14, over a suitable architecture that permits the transfer of power and/or data, such as a bus, to present the sensor data associated with the observed torque.

With reference to FIG. 5, as the assembly of the torque measurement system 400 is substantially similar to the assembly of the torque measurement system 10 discussed with regard to FIGS. 1-2, the assembly of the torque measurement system 400 will not be discussed in great detail herein. As a torque is applied to the shaft 12, the second end 410 of the first housing portion 402 rotates relative to the second housing portion 404, which results in an angular shift, phase shift or change in the periodic signal generated by the observation of the sensor probe 406a as compared to the periodic signal generated by the sensor probe 406b. The phase shift 426 between the periodic signal of the sensor probe 406a and the periodic signal of the sensor probe 406b is directly proportional to the torque acting on the shaft 12. The module 424 interprets the sensor signals or sensor data from the sensor probes 406a, 406b of the sensor 406 and determines the phase shift 426. Based on the determined phase shift 426, the module 424 may access the look up table and determine the torque measurement based on the determined phase shift 426.

Figure 6:
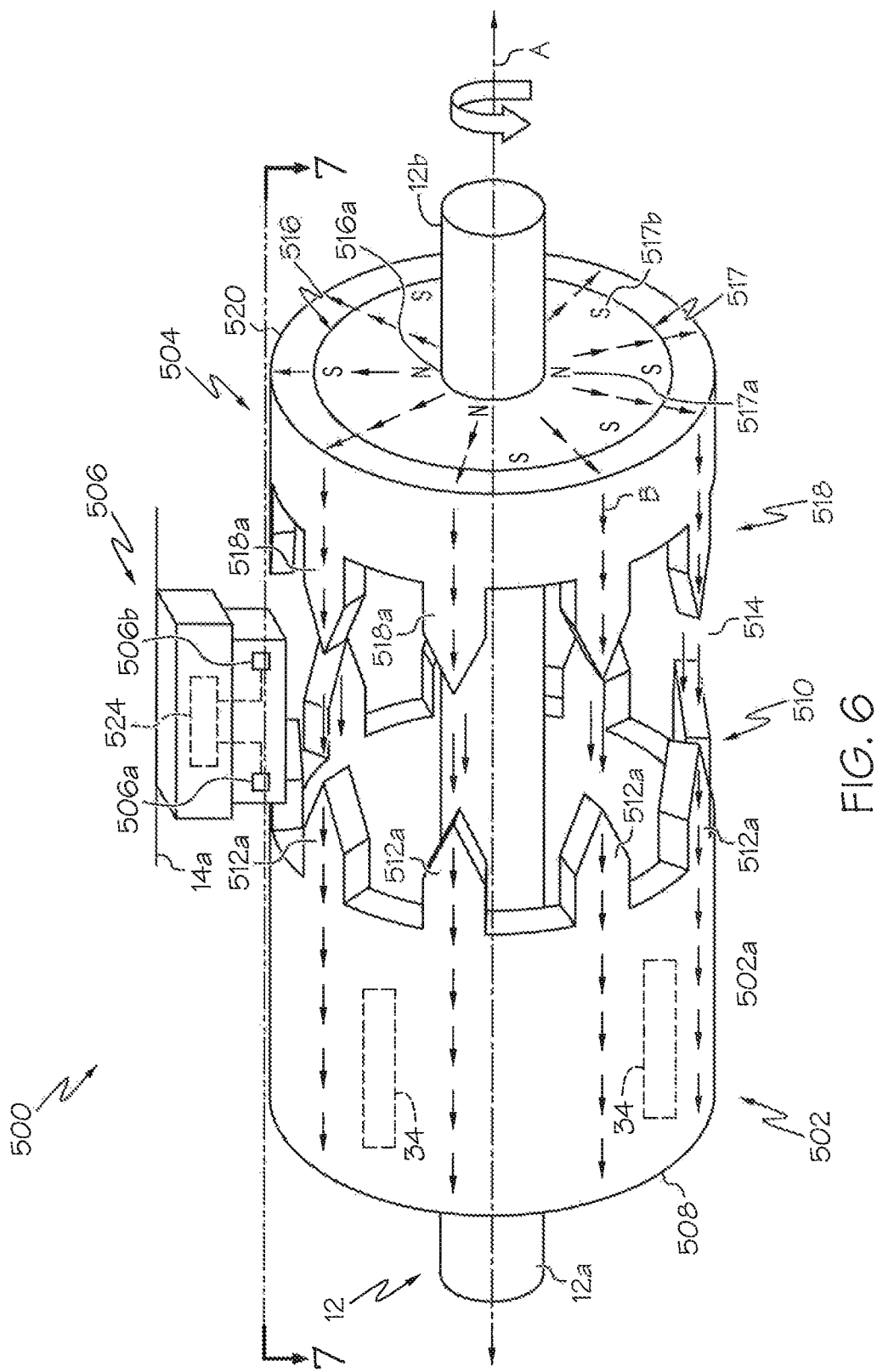
FIG. 6 is a schematic perspective illustration of a torque measurement system for use with a rotating shaft, such as a crank shaft of an electrical bicycle, in accordance with various embodiments.

With reference now to FIG. 6, a perspective schematic illustration of a torque measurement system 500 is shown. As the torque measurement system 500 can be similar to the torque measurement system 300 discussed with regard to FIG. 4, only the differences between the torque measurement system 300 and the torque measurement system 500 will be discussed in detail herein, with the same reference numerals used to denote the same or substantially similar components. The torque measurement system 500 is coupled to the shaft 12, which in this example is a crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). The torque measurement system 500 includes a first housing portion 502, a second housing portion 504 and the sensor 506.

The first housing portion 502 has a first end 508 and a second end 510. The first housing portion 502 is coaxial with the shaft 12, and in one example, the first housing portion 502 is cylindrical, however, it will be understood that the first housing portion 502 may have any desired shape. The first end 508 of the first housing portion 502 is coupled to the shaft 12 near a first shaft end 12a of the shaft 12. The first end 508 is coupled to the shaft 12 so as to be fixed relative to the shaft 12 for rotation therewith. In one example, the first end 508 is welded to the shaft 12, but the first end 508 may be fixedly coupled to the shaft 12 using any desired technique as known to one skilled in the art. The first housing portion 502 also includes one or more elastically deformable elements 34. In one example, the one or more elastically deformable elements 34 are integral with or embedded into the first housing portion 502, and may comprise a portion of a sidewall 502a of the first housing portion 502. The elastically deformable elements 34 are configured to deform upon the application of the torque to the shaft 12, thereby resulting in a rotation of the second end 510 of the first housing portion 502. It should be noted that while the elastically deformable elements 34 are described as being coupled to the first housing portion 502, the torque measurement system 500 may alternatively include the shaft 102 having the elastically deformable elements 110 described with regard to FIG. 3 instead of the elastically deformable elements 34 coupled to the first housing portion 502.

The second end 510 of the first housing portion 502 is adjacent to the second shaft end 12b of the shaft 12. The second end 510 is generally circumferentially open, and the second end 510 is not coupled to the second shaft end 12b. Thus, only the first end 508 of the first housing portion 502 is coupled to the shaft 12, and the second end 510 is free. It should be noted that while the first housing portion 502 is illustrated herein as having the substantially solid sidewall 502a between the first end 508 and the second end 510, the first housing portion 502 may include one or more cut-outs, openings or slots to reduce the weight and/or improve the flexibility of the first housing portion 502.

In this example, the second end 510 of the first housing portion 502 includes a first periodic shape pattern, such as a first plurality of teeth 512. It will be understood that the first periodic shape profile may comprise any suitable periodic or repeating pattern of shapes, and thus, the use of teeth is merely exemplary. The first plurality of teeth 512 are coupled to the first housing portion 502 so as to extend about a perimeter or circumference of the second end 510 in a specific, defined periodic shape profile pattern. In this regard, each tooth 512a of the first plurality of teeth 512 are arranged about the perimeter of the second end 510 with a unique pattern, which may include one tooth 512a being spaced apart from another tooth 512a at a distance that is different than a reminder of the first plurality of teeth 512. It should be noted, however, that the teeth 512a may be arranged in any suitable defined pattern, which is observable by the sensor 506. The first plurality of teeth 512 may be integrally formed with the second end 510, or may be coupled to the second end 510 through a suitable technique, such as welding. The first plurality of teeth 512 are observable by the sensor 506.

The second housing portion 504 is spaced apart from the second end 510 of the first housing portion 502 by a gap 514, which comprises an air gap. The gap 514 enables movement of the second end 510 of the first housing portion 502 relative to the second housing portion 504 and is sized to cooperate with the sensor 506. The second housing portion 504 is generally annular, and is coupled to the shaft 12 near the second shaft end 12b of the shaft 12. The second housing portion 504 is fixedly coupled about the shaft 12, via welding, for example, such that the second housing portion 504 rotates with the shaft 12. The second housing portion 504 has a diameter, which may be substantially equal to a diameter of the first housing portion 502. The second housing portion 504 acts as a frame of reference for the sensor 506 to measure the rotational angle displacement or angular deflection between the second end 510 of the first housing portion 502 and the second housing portion 504.

The second housing portion 504 includes a body 516 and a second periodic shape pattern, such as a second plurality of teeth 518. It will be understood that the second periodic shape profile may comprise any suitable periodic or repeating pattern of shapes, and thus, the use of teeth is merely exemplary. The body 516 is generally annular, and is fixedly coupled to the shaft 12 via a throughbore 516a. The body 516 comprises at least one radial or axial single pole magnet 517, which is generally a permanent magnet. The single pole magnet 517 generates a magnetic field B, which propagates through the second plurality of teeth 518 and the first plurality of teeth 512, as illustrated in dashed lines 519a, 519b in FIG. 7. The use of the single pole magnet 517 in the body 516 generates a periodic magnetic field pattern in the location of the gap 514 with magnetic field lines between the specific or unique pattern of the second plurality of teeth 518 and the first plurality of teeth 512, as shown in FIG. 6. It should be noted that while the single pole magnet 517 is illustrated herein as being part of the second housing portion 504, the single pole magnet 517 may also be located either on the shaft 12, or coupled to the first housing portion 502. The single pole magnet 517 generally comprises a north pole 517a near the throughbore 516a, and a south pole 517b near a perimeter or circumference of the body 516 or vice versa.

The second plurality of teeth 518 is coupled to the body 516 via a ring 520. The ring 520 is coupled to the body 516 so as to extend about the perimeter or circumference of the single pole magnet 517. The ring 520 may be coupled to the body 516 through a suitable technique, such as welding. The second plurality of teeth 518 are coupled to the ring 520 in a specific, defined pattern. Generally, the second plurality of teeth 518 are integrally formed with the ring 520, and extend outwardly from the ring 520 in a direction towards the second end 510 of the first housing portion 502. Each tooth 518a of the first plurality of teeth 518 are arranged about the perimeter of the ring 520 with a unique pattern, which may include one tooth 518a being spaced apart from another tooth 518a at a distance that is different than a reminder of the second plurality of teeth 518. It should be noted, however, that the teeth 518a may be arranged in any suitable defined pattern, which is observable by the sensor 506.

Figure 7:
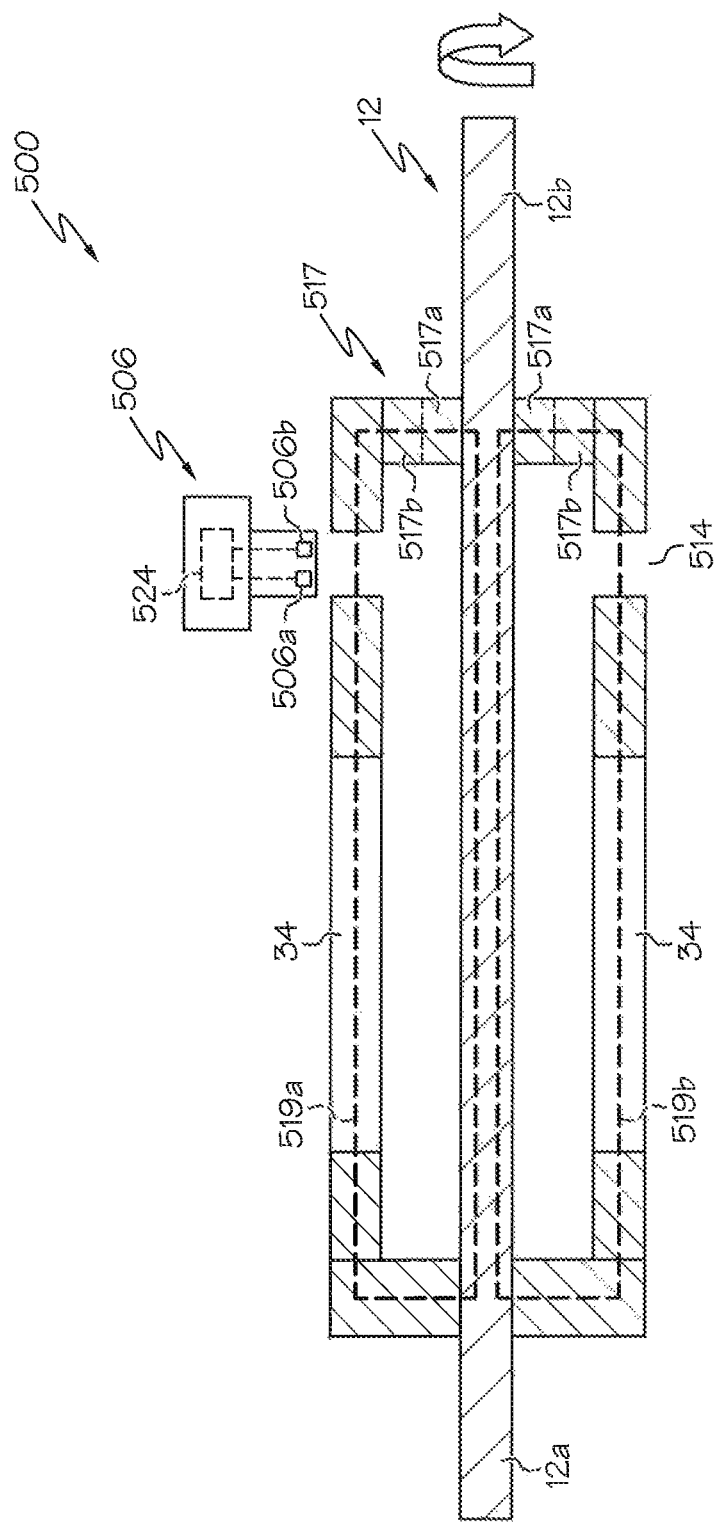
FIG. 7 is a schematic cross-sectional illustration of the torque measurement system of FIG. 6, taken along line 7-7 of FIG. 6.

The axial single pole magnet 517 of the body 516 cooperates with the first plurality of teeth 512 and the second plurality of teeth 518 to generate a periodic magnetic field pattern in the gap 514 with a magnetic field between the first plurality of teeth 512 and the second plurality of teeth 518, as illustrated in FIG. 7. The sensor 506 observes the magnetic field associated with the first plurality of teeth 512 and the second plurality of teeth 518. In this example, with reference to FIG. 6, the sensor 506 is a magnetic speed sensor, which includes two Hall or magneto resistive speed sensor probes 506a, 506b. The sensor probes 506a, 506b each observe the magnetic field B associated with the respective one of the first plurality of teeth 512 and the second plurality of teeth 518, and generate sensor signals based thereon.

Figure 5A:
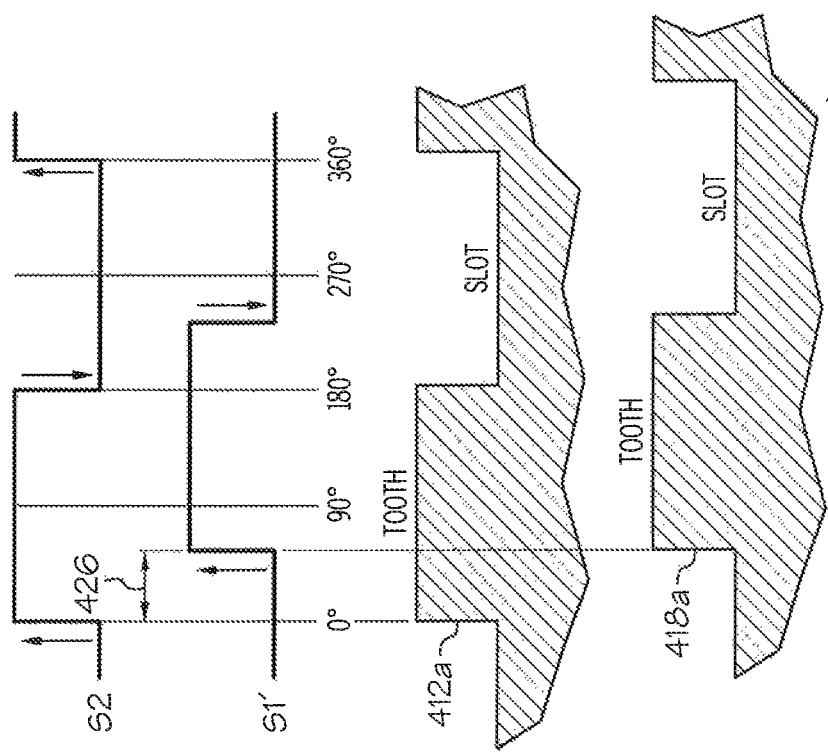
FIG. 5A is a schematic illustration of exemplary sensor data generated by a sensor associated with the torque measurement system of FIG. 5.

In this regard, the two sensor probes 506a, 506b of the sensor 506 observe and generate two periodic signals s1 and s2 during the rotation of the shaft 12, as discussed with regard to the sensor 406 in FIG. 5A. As a torque is applied to the shaft 12, the second end 510 rotates or deflects due to the elastically deformable elements 34, and the sensor probes 506a, 506b generate two periodic sensor signals, the periodic signal generated by the sensor probe 506a is shifted compared to the periodic signal generated by the sensor probe 506b when there is a torque applied to the shaft 12. A measure of the phase shift between the two periodic signals s1 and s2 generated by the sensor probes 506a, 506b when a torque is applied to the shaft 12 is a direct measure of the rotational angle shift or angular deflection (generally about positive 4 degrees to about negative 4 degrees) between the second end 510 of the first housing portion 502 and the second housing portion 504, which is directly proportional to the torque applied on the shaft 12. The comparison between the two signals generated by the sensor probes 506a, 506b to determine the phase shift may be performed by a module 524 or processor located within a housing of the sensor 506 to determine the torque measurement, via a look-up calibration table for example, or the two signals generated by the sensor probes 506a, 506b may be output to an external module or processor in communication with the sensor probes 506a, 506b over a suitable architecture that facilitates the transfer of data and/or power. In one example, the module 524 interprets the sensor signals or sensor data from the sensor probes 506a, 506b of the sensor 506 and determines the phase shift. Based on the determined phase shift, the module 524 may access the look up table, which may be stored in a datastore in communication with the module 524 or in a memory associated with the module 524, and determine the torque measurement based on the determined phase shift.

The sensor 506 is fixed to a static structure, such as the frame 14a of the electrical bicycle 14 (FIG. 1). Generally, the sensor 506 is coupled to the static structure so as to be stationary relative to the shaft 12. The sensor 506 is coupled to the frame 14a such that the sensor probes 506a, 506b are aligned with a respective one of the first plurality of teeth 512 and the second plurality of teeth 518. The sensor 506 observes a shift in the magnetic field as indicated by the phase shift in the periodic signals generated by the sensor probes 506a, 506b when a torque is applied to the shaft 12, which is proportional to the angular deflection of the second end 510 of the first housing portion 502 when a torque is applied to the shaft 12. Thus, the sensor signals generated by observing the shift in the magnetic field with the sensor 506 are indicative of a torque applied to the rotatable shaft 12. The sensor 506 may be in communication with a control module and/or a monitoring module associated with the electrical bicycle 14 over a suitable architecture that permits the transfer of power and/or data, such as a bus, to provide the sensor signals from the sensor probes 506a, 506b and/or the torque measurement to be used for controlling an aspect of the electrical bicycle 14, such as providing an electrical motion assistance to the user that is proportional to the effort generated by the user of the electrical bicycle 14. The sensor 506 may also be in communication with a display device associated with the electrical bicycle 14, over a suitable architecture that permits the transfer of power and/or data, such as a bus, to provide the sensor data from the sensor probes 506a, 506b and/or the torque measurement associated with the observed torque for display on the display device.

As the assembly of the torque measurement system 500 is substantially similar to the assembly of the torque measurement system 10 discussed with regard to FIGS. 1-2, the assembly of the torque measurement system 500 will not be discussed in great detail herein. As the shaft 12 rotates, the sensor probes 506a, 506b observe the magnetic field B associated with the respective one of the first plurality of teeth 512 and the second plurality of teeth 518. The sensor probes 506a, 506b generate sensor signals based on the observation. As a torque is applied to the shaft 12, the second end 510 of the first housing portion 502 rotates relative to the second housing portion 504, which results in an angular shift in the periodic magnetic field observed by the sensor probe 506a as compared to the periodic magnetic field observed by the sensor probe 506b. The shift in the magnetic field observed by the sensor probe 506a results in a shift in the periodic signal generated by the sensor probe 506a compared to the periodic signal generated by the sensor probe 506b (i.e. a phase shift). The phase shift between the periodic signal of the sensor probe 506a and the periodic signal of the sensor probe 506b is directly proportional to the torque acting on the shaft 12. The module 524 interprets the sensor signals or sensor data from the sensor probes 506a, 506b of the sensor 506 and determines the phase shift. Based on the determined phase shift, the module 524 may access the look up table and determine the torque measurement based on the determined phase shift.

Figure 8:
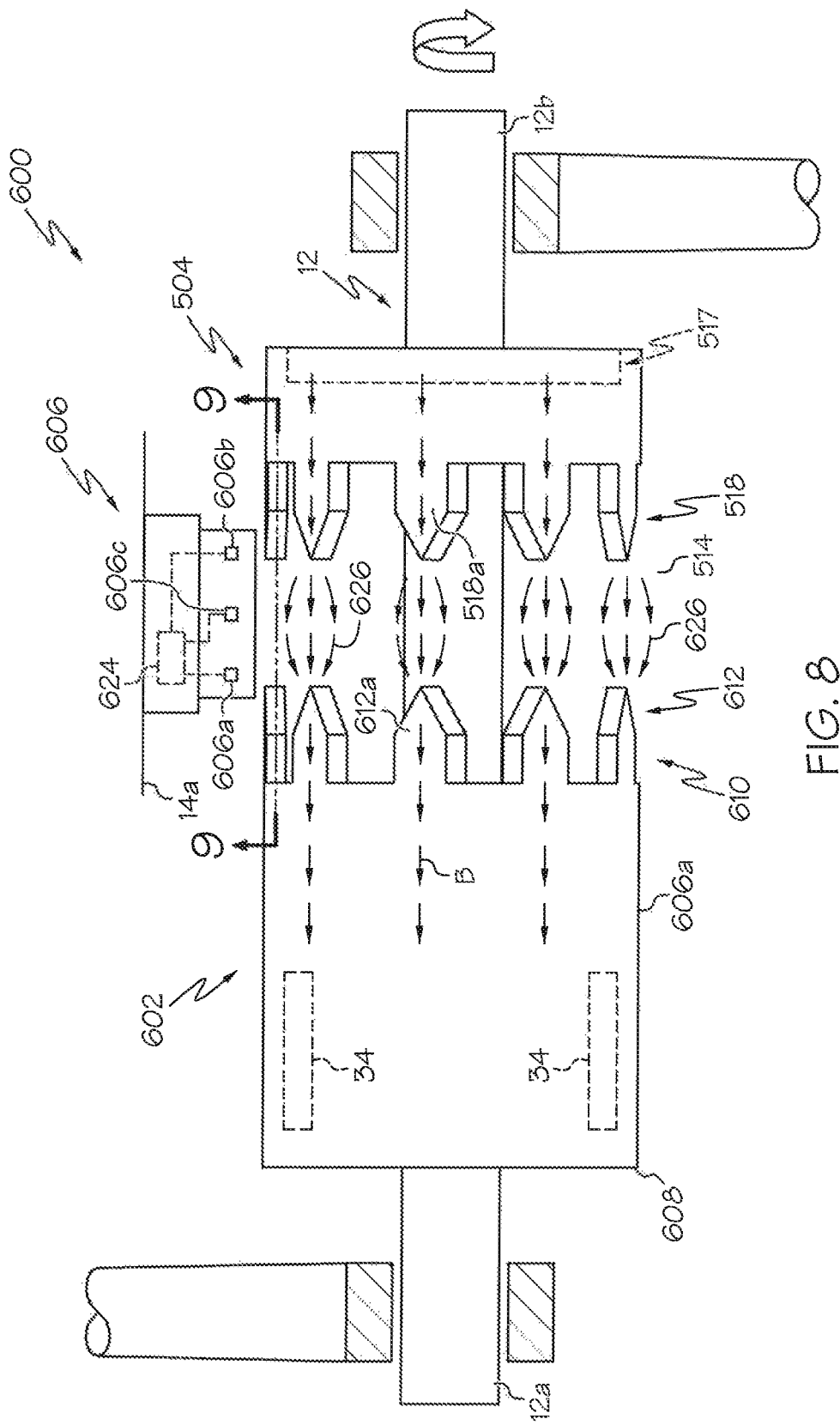
FIG. 8 is a schematic perspective illustration of a torque measurement system for use with a rotating shaft, such as a crank shaft of an electrical bicycle, in accordance with various embodiments.

With reference now to FIG. 8, a perspective schematic illustration of a torque measurement system 600 is shown. As the torque measurement system 600 can be similar to the torque measurement system 500 discussed with regard to FIGS. 6-7, only the differences between the torque measurement system 500 and the torque measurement system 600 will be discussed in detail herein, with the same reference numerals used to denote the same or substantially similar components. The torque measurement system 600 is coupled to the shaft 12, which in this example is the pedal crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). The torque measurement system 600 includes a first housing portion 602, the second housing portion 504 and a sensor 606.

The first housing portion 602 has a first end 608 and a second end 610. The first housing portion 602 is coaxial with the shaft 12, and in one example, the first housing portion 602 is cylindrical, however, it will be understood that the first housing portion 602 may have any desired shape. The first end 608 of the first housing portion 602 is coupled to the shaft 12 near a first shaft end 12a of the shaft 12. The first end 608 is coupled to the shaft 12 so as to be fixed relative to the shaft 12 for rotation therewith. In one example, the first end 608 is welded to the shaft 12, but the first end 608 may be fixedly coupled to the shaft 12 using any desired technique as known to one skilled in the art. The first housing portion 602 also includes the one or more elastically deformable elements 34. In one example, the one or more elastically deformable elements 34 are integral with or embedded into the first housing portion 602, and may comprise a portion of a sidewall 602a of the first housing portion 602. The elastically deformable elements 34 are configured to deform upon the application of the torque to the shaft 12, thereby resulting in a rotation of the second end 610 of the first housing portion 602. It should be noted that while the elastically deformable elements 34 are described as being coupled to the first housing portion 602, the torque measurement system 600 may alternatively include the shaft 102 having the elastically deformable elements 110 described with regard to FIG. 3 instead of the elastically deformable elements 34 coupled to the first housing portion 602.

The second end 610 of the first housing portion 602 is adjacent to the second shaft end 12b of the shaft 12. The second end 610 is generally circumferentially open, and the second end 610 is not coupled to the second shaft end 12b. Thus, only the first end 608 of the first housing portion 602 is coupled to the shaft 12, and the second end 610 is free. It should be noted that while the first housing portion 602 is illustrated herein as having the substantially solid sidewall 602a between the first end 608 and the second end 610, the first housing portion 602 may include one or more cut-outs, openings or slots to reduce the weight and/or improve the flexibility of the first housing portion 602.

In this example, the second end 610 of the first housing portion 602 includes a first periodic shape pattern, for example, a first plurality of teeth 612. It will be understood that the first periodic shape profile may comprise any suitable periodic or repeating pattern of shapes, and thus, the use of teeth is merely exemplary. The first plurality of teeth 612 are coupled to the first housing portion 602 so as to extend about a perimeter or circumference of the second end 610 in a specific, defined periodic shape profile pattern. In this regard, each tooth 612a of the first plurality of teeth 612 are arranged about the perimeter of the second end 610 with a unique pattern, which may include one tooth 612a being spaced apart from another tooth 612a at a distance that is different than a reminder of the first plurality of teeth 612. It should be noted, however, that the teeth 612a may be arranged in any suitable defined pattern, which is observable by the sensor 606. The first plurality of teeth 612 may be integrally formed with the second end 610, or may be coupled to the second end 610 through a suitable technique, such as welding. Generally, with reference to FIG. 9, when no torque is applied to the shaft 12, the pattern of the first plurality of teeth 612 is offset from the pattern of the second plurality of teeth 518, such that the tooth 612a is not aligned with a tooth 518a when the shaft 12 is static (i.e. not rotating) and not subject to a torque. In one example, each of the second plurality of teeth 518 has a width W, and the first plurality of teeth 612 are each offset by a distance D equal to about half the width W of each of the second plurality of teeth 518. In other words, each tooth 612a of the first plurality of teeth 612 is offset from a respective tooth 518a of the second plurality of teeth 518.

With reference to FIG. 8, the single pole magnet 517 of the body 516 cooperates with the first plurality of teeth 612 and the second plurality of teeth 518 to generate a periodic magnetic field pattern in the gap 514 with magnetic field lines extending between the first plurality of teeth 612 and the second plurality of teeth 518, as illustrated. The sensor 606 observes the magnetic field B associated with the first plurality of teeth 612 and the second plurality of teeth 518. In one example, the sensor 606 is a magnetic speed sensor and a magnetic field orientation sensor. In this example, the sensor 606 includes two Hall or magneto resistive speed sensor probes 606a, 606b and a magnetic field orientation sensor 606c.

The sensor probes 606a, 606b each observe the magnetic field B associated with the respective one of the first plurality of teeth 612 and the second plurality of teeth 518, and generate sensor signals based thereon. The two sensor probes 606a, 606b of the sensor 606 observe and generate two periodic signals s1 and s2 during the rotation of the shaft 12. As a torque is applied to the shaft 12, the second end 610 rotates or deflects due to the elastically deformable elements 34, and the sensor probes 606a, 606b generate two periodic sensor signals, the periodic signal generated by the sensor probe 606a is shifted compared to the periodic signal generated by the sensor probe 606b when there is a torque applied to the shaft 12. A measure of the phase shift between the two periodic signals s1 and s2 generated by the sensor probes 606a, 606b when a torque is applied to the shaft 12 is a direct measure of the rotational angle shift or angular displacement (generally about positive 4 degrees to about negative 4 degrees) between the second end 610 of the first housing portion 602 and the second housing portion 504, which is directly proportional to the torque applied on the shaft 12. The comparison between the two signals generated by the sensor probes 606a, 606b may be performed by a module 624 or processor located within a housing of the sensor 606 to determine the torque measurement, via a look-up calibration table, for example, or the two signals generated by the sensor probes 606a, 606b may be output to an external module or processor in communication with the sensor probes 606a, 606b over a suitable architecture that facilitates the transfer of data and/or power. In one example, the module 624 interprets the sensor signals or sensor data from the sensor probes 606a, 606b of the sensor 606 and determines the phase shift. Based on the determined phase shift, the module 624 may access the look up table, which may be stored in a datastore in communication with the module 624 or in a memory associated with the module 624, and determines the torque measurement based on the determined phase shift. Stated another way, the sensor 606 observes a shift in the magnetic field as indicated by the phase shift in the periodic signals generated by the sensor probes 606a, 606b when a torque is applied to the shaft 12, which is proportional to the angular deflection of the second end 610 of the first housing portion 602 when a torque is applied to the shaft 12. Thus, the sensor signals generated by observing the shift in the magnetic field with the sensor 606 are indicative of a torque applied to the rotatable shaft 12.

The sensor probe 606c observes an angular orientation of the magnetic field B in the gap 514 and generates sensor signals based thereon. In this regard, with reference to FIGS. 9 and 10, the sensor probe 606c observes the angular orientation a of the periodic magnetic field pattern, represented schematically as a prolate spheroid 626, between the first plurality of teeth 612 and the second plurality of teeth 518 and generates sensor signals based thereon. The measurement of the variation in the angular orientation a of the magnetic field pattern is a direct measurement of the torque applied to the shaft 12 as the angular orientation a varies proportionally with the rotational angle shift (about positive 4 degrees to about negative 4 degrees) between the second end 610 of the first housing portion 602 and the second housing portion 504, as illustrated in FIG. 10. In the example of FIG. 10, torque is applied to the shaft 12 as the shaft 12 rotates, resulting in a change in the angular orientation a of the magnetic field pattern (from the static orientation shown in FIG. 9) as observed by the sensor probe 606c. Generally, the angular orientation a of the magnetic field pattern ranges from about negative 45 degrees to positive 45 degrees. The measurement of the variation in the angular orientation a of the magnetic field pattern based on the signal generated by the sensor probe 606c may be performed by the module 624 or processor located within a housing of the sensor 606 to determine the torque measurement, via a look-up calibration table for example, or the signal generated by the sensor probe 606c may be output to an external module or processor in communication with the sensor probe 606c over a suitable architecture that facilitates the transfer of data and/or power. The use of the sensor probe 606c provides a redundant measure of the torque acting on the rotating shaft 12. It should be noted that the sensor probe 606c may be used alone, or may be used in conjunction with the sensor probes 606a, 606b to provide a redundant measurement. In one example, the module 624 interprets the sensor signals or sensor data from the sensor probe 606c of the sensor 606 and determines the angular orientation a of the magnetic field pattern. Based on the determined angular orientation a of the magnetic field pattern, the module 624 may access the look up table, which may be stored in a datastore in communication with the module 624 or in a memory associated with the module 624, and determine the torque measurement based on the determined angular orientation a of the magnetic field pattern.

The sensor 606 is fixed to a static structure, such as the frame 14a of the electrical bicycle 14 (FIG. 1). Generally, the sensor 606 is coupled to the static structure so as to be stationary relative to the shaft 12. The sensor 606 is coupled to the frame 14a such that the sensor probes 606a, 606b are aligned with a respective one of the first plurality of teeth 612 and the second plurality of teeth 518, and the sensor probe 606c is aligned with the gap 514. The sensor 606 may be in communication with a control module and/or a monitoring module associated with the electrical bicycle 14 over a suitable architecture that permits the transfer of power and/or data, such as a bus, to provide the sensor signals from the sensor probes 606a, 606b, 606c and/or the torque measurement to be used for controlling an aspect of the electrical bicycle 14, such as providing an electrical motion assistance to the user that is proportional to the effort generated by the user of the electrical bicycle 14. The sensor 606 may also be in communication with a display device associated with the electrical bicycle 14, over a suitable architecture that permits the transfer of power and/or data, such as a bus, to provide the sensor data from the sensor probes 606a, 606b, 606c and/or the torque measurement associated with the observed torque for display on the display device.

As the assembly of the torque measurement system 600 is substantially similar to the assembly of the torque measurement system 10 discussed with regard to FIGS. 1-2, the assembly of the torque measurement system 600 will not be discussed in great detail herein. As the shaft 12 rotates, the sensor probes 606a, 606b observe the magnetic field B associated with the respective one of the first plurality of teeth 612 and the second plurality of teeth 518, and the sensor probe 606c observes the angular orientation a of the magnetic field pattern. The sensor probes 606a, 606b, 606c generate sensor signals based on the observation. As a torque is applied to the shaft 12, the second end 610 of the first housing portion 602 rotates due to the one or more elastically deformable elements 34, which results in an angular shift in the periodic magnetic field observed by the sensor probe 606a compared to the periodic magnetic field observed by the sensor probe 606b. The shift in the magnetic field observed by the sensor probe 606a results in a shift in the periodic signal generated by the sensor probe 606a as compared to the periodic signal generated by the sensor probe 606b (i.e. phase shift). The phase shift between the periodic signal of the sensor probe 606a and the periodic signal of the sensor probe 606b is directly proportional to the torque acting on the shaft 12. The module 624 interprets the sensor signals or sensor data from the sensor probes 606a, 606b of the sensor 606 and determines the phase shift. Based on the determined phase shift, the module 624 may access the look up table and determine the torque measurement based on the determined phase shift.

As a torque is applied to the shaft 12, the second end 610 of the first housing portion 602 rotates relative to the second housing portion 604, which results in a movement of the angular orientation a of the magnetic field pattern observed by the sensor probe 606c. The movement of the angular orientation a of the magnetic field pattern observed by the sensor probe 606c results in a change in the signal generated by the sensor probe 606c due to the movement between the first plurality of teeth 612 and the second plurality of teeth 518. The change in the angular orientation a of the magnetic field pattern is directly proportional to the amount of torque acting on the shaft 12. The module 624 interprets the sensor signals or sensor data from the sensor probe 606c of the sensor 606 and determines the angular orientation a of the magnetic field pattern. Based on the determined angular orientation a of the magnetic field pattern, the module 624 may access the look up table and determine the torque measurement based on the determined angular orientation a of the magnetic field pattern.

Figure 11:
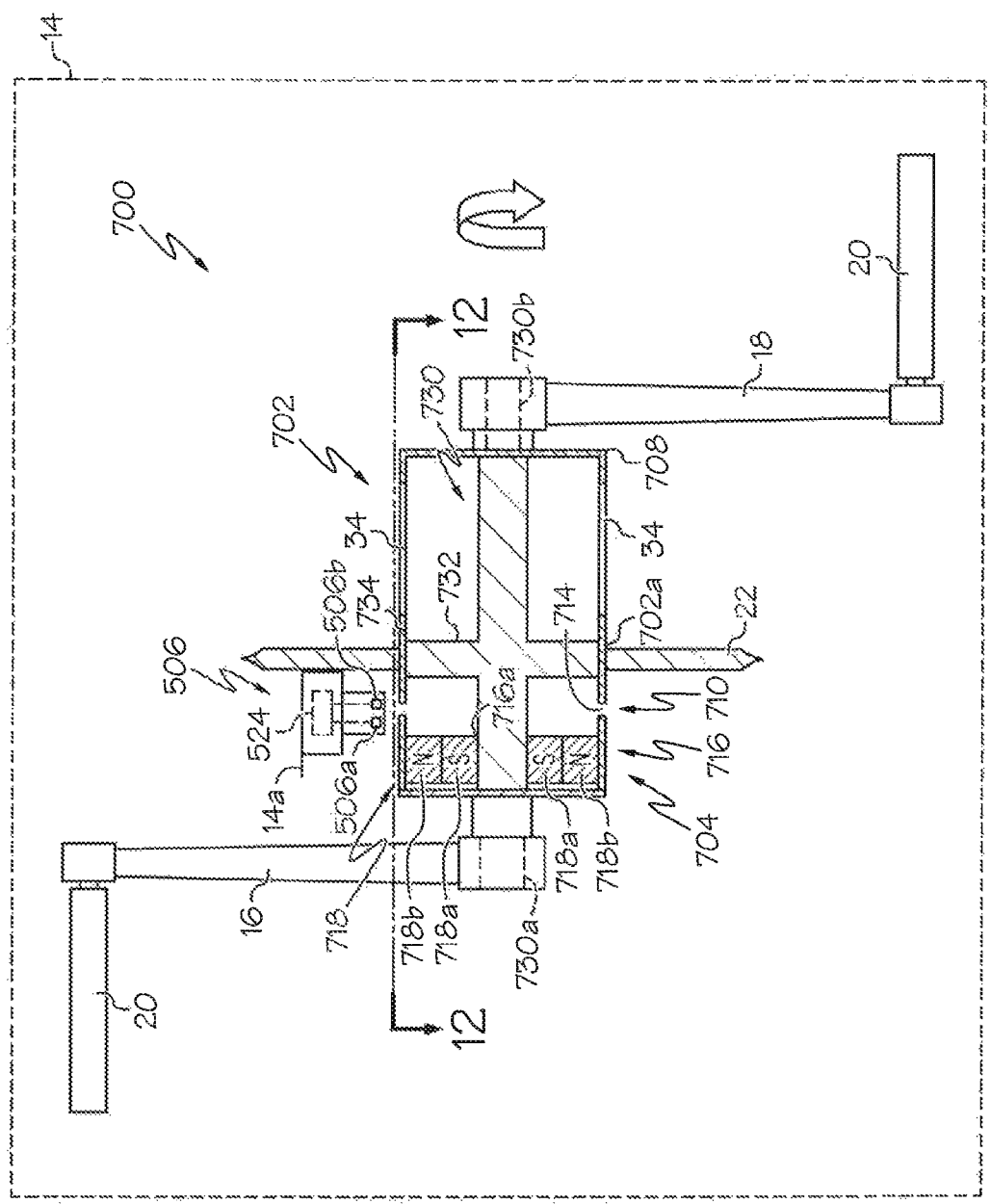
FIG. 11 is a schematic partial cross-sectional illustration of a torque measurement system for use with a rotating shaft, such as a crank shaft of an electrical bicycle, in accordance with various embodiments.

With reference now to FIG. 11, a schematic partially cross-sectional illustration of a torque measurement system 700 is shown. As the torque measurement system 700 can be similar to the torque measurement system 500 discussed with regard to FIG. 6, only the differences between the torque measurement system 500 and the torque measurement system 700 will be discussed in detail herein, with the same reference numerals used to denote the same or substantially similar components. The torque measurement system 700 is coupled to a shaft 730, which in this example is a crank shaft of an electrical bicycle 14. The shaft 730 is rotatable or configured to rotate upon receipt of an input. The shaft 730 is coupled to the first crank arm 16 and the second crank arm 18 to receive the input from the operator of the electrical bicycle 14. In this example, the shaft 730 includes a radial extension 732. The radial extension 732 is substantially annular, and extends outwardly from the shaft 730 between a first shaft end 730a and a second shaft end 730b. The radial extension 732 may be integrally formed with the shaft 730, or may be coupled to the shaft 730 so as to extend annularly about the shaft 730 through any suitable technique, such as welding. The radial extension 732 may be composed of the same or a different material than the shaft 730. Generally, the radial extension 732 is composed of a ferromagnetic conductive material, such as a metal or a metal alloy. The use of a ferromagnetic conductive material enables a magnetic field generated by the torque measurement system 700 to be directed through the radial extension 732.

The torque measurement system 700 includes a first housing portion 702, a second housing portion 704 and the sensor 506. The first housing portion 702 has a first end 708 and a second end 710. The first housing portion 702 is coaxial with the shaft 730, and in one example, the first housing portion 702 is cylindrical, however, it will be understood that the first housing portion 702 may have any desired shape. The first housing portion 702 has a diameter, which is sized to provide a clearance 703 between the radial extension 732 of the shaft 730 and the first housing portion 702. Generally, the radial extension 732 is received within the first housing portion 702 to be rotatable with the shaft 730 relative to the first housing portion 702.

The first end 708 of the first housing portion 702 is coupled to the shaft 730 near the second shaft end 730b of the shaft 730. The first end 708 is coupled to the shaft 730 so as to be fixed relative to the shaft 730 for rotation therewith. In one example, the first end 708 is welded to the shaft 730, but the first end 708 may be fixedly coupled to the shaft 730 using any desired technique as known to one skilled in the art. The first housing portion 702 also includes one or more elastically deformable elements 34. In one example, the one or more elastically deformable elements 34 are integral with or embedded into the first housing portion 702, and may comprise a portion of a sidewall 702a of the first housing portion 702. The elastically deformable elements 34 are configured to deform upon the application of the torque to the shaft 730, thereby resulting in a rotation of the second end 710 of the first housing portion 702. It should be noted that while the elastically deformable elements 34 are described as being coupled to the first housing portion 702, the torque measurement system 700 may alternatively include the shaft 102 having the elastically deformable elements 110 described with regard to FIG. 3 instead of the elastically deformable elements 34 coupled to the first housing portion 702.

The second end 710 of the first housing portion 702 is adjacent to the first shaft end 730a of the shaft 730. The second end 710 is generally circumferentially open, and the second end 710 is not coupled to the first shaft end 730a. Thus, only the first end 708 of the first housing portion 702 is coupled to the shaft 730, and the second end 710 is free. It should be noted that while the first housing portion 702 is illustrated herein as having the substantially solid sidewall 702a between the first end 708 and the second end 710, the first housing portion 702 may include one or more cut-outs, openings or slots to reduce the weight and/or improve the flexibility of the first housing portion 702.

The second housing portion 704 is spaced apart from the second end 710 of the first housing portion 702 by a gap 714, which comprises an air gap. The gap 714 enables movement of the second end 710 of the first housing portion 702 relative to the second housing portion 704 and is sized to cooperate with the sensor 506. The second housing portion 704 is generally annular, and is coupled to the shaft 730 near the second shaft end 730b of the shaft 730. The second housing portion 704 is fixedly coupled about the shaft 730, via welding, for example, such that the second housing portion 704 rotates with the shaft 730. The second housing portion 704 has a diameter, which may be substantially equal to a diameter of the first housing portion 702. The second housing portion 704 acts as a frame of reference for the sensor 506 to measure the rotational angle displacement or angular deflection between the second end 710 of the first housing portion 702 and the second housing portion 704.

Figure 12:
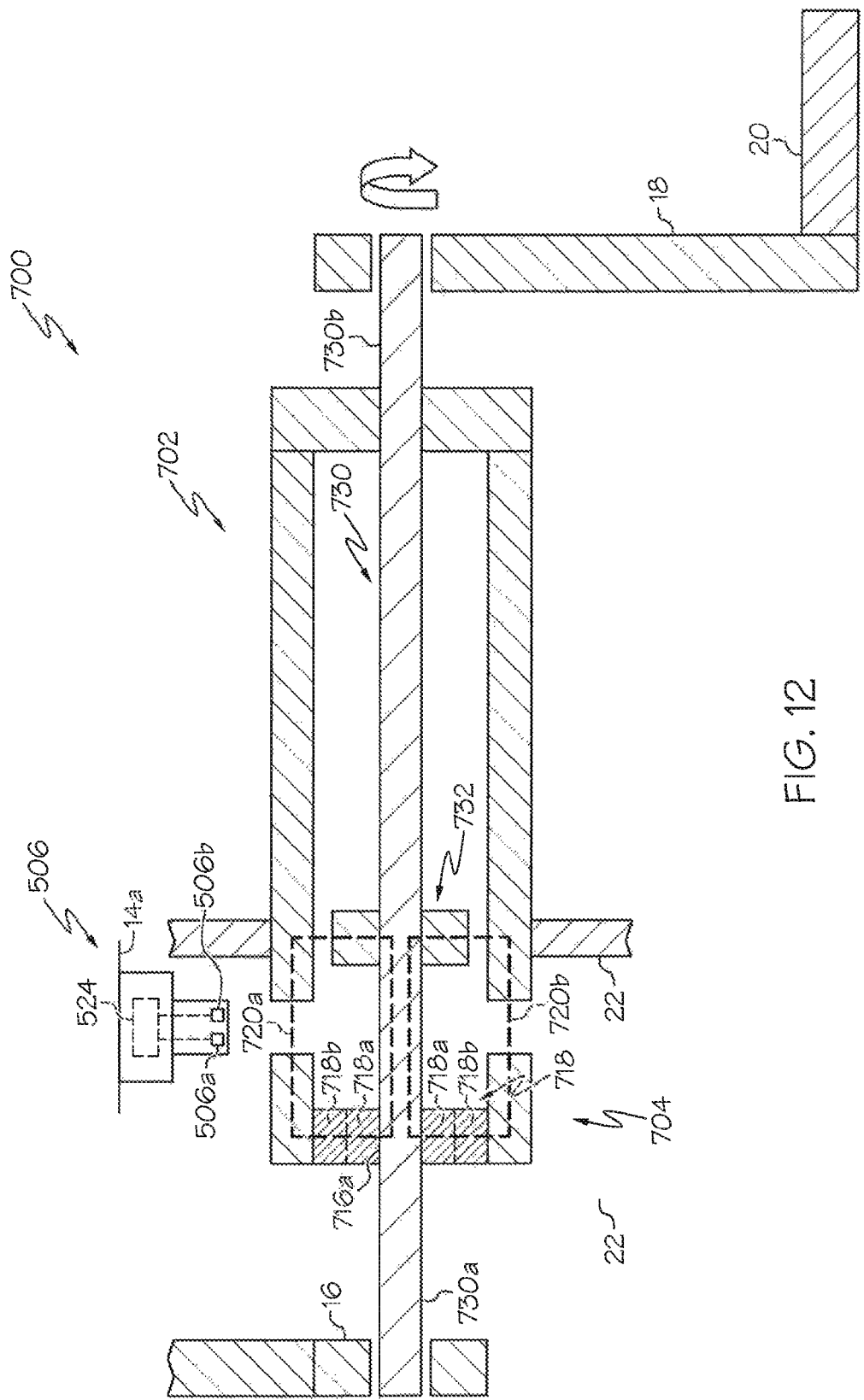
FIG. 12 is a schematic cross-sectional illustration of the torque measurement system of FIG. 11, taken along line 12-12 of FIG. 11.

The second housing portion 704 includes a body 716. The body 716 is generally annular, and is fixedly coupled to the shaft 12 via a throughbore 716a. The body 716 comprises at least one radial or axial single pole magnet 718, which is generally a permanent magnet. The single pole magnet 718 generates a magnetic field, which propagates through the radial extension 732, as illustrated in dashed lines 720a, 720b in FIG. 12. The use of the single pole magnet 718 in the body 716 generates a periodic magnetic field pattern with magnetic field lines that flow through the radial extension 732, as shown in FIG. 12. It should be noted that while the single pole magnet 718 is illustrated herein as being part of the second housing portion 704, the single pole magnet 718 may also be located either on the shaft 730, or on the first housing portion 702. The single pole magnet 718 generally comprises a south pole 718a near the throughbore 716a, and a north pole 718b near a perimeter or circumference of the body 716 or vice versa.

The single pole magnet 718 cooperates with the radial extension 732 to generate a periodic magnetic field pattern, as illustrated in FIG. 12. The sensor 506 observes the magnetic field generated by the single pole magnet 718. In this example, with reference to FIG. 11, the sensor 506 is the magnetic speed sensor, which includes two Hall or magneto resistive speed sensor probes 506a, 506b. The sensor probes 506a, 506b each observe the magnetic field associated with the single pole magnet 718, and generate sensor signals based thereon.

As discussed with regard to FIG. 6, the two sensor probes 506a, 506b of the sensor 506 observe and generate two periodic signals s1 and s2 during the rotation of the shaft 730. As a torque is applied to the shaft 730, the second end 710 rotates or deflects due to the elastically deformable elements 34, and the sensor probe 506a generates a sensor signal, the period of which is shifted compared to the periodic signal generated by the sensor probe 506b when there is a torque applied to the shaft 730. A measure of the phase shift between the two periodic signals s1 and s2 generated by the sensor probes 506a, 506b when a torque is applied to the shaft 730 is a direct measure of the rotational angle shift (generally about positive 4 degrees to about negative 4 degrees) between the second end 710 of the first housing portion 702 and the second housing portion 704, which is directly proportional to the torque applied on the shaft 730. The comparison between the two periodic signals generated by the sensor probes 506a, 506b may be performed by the module 524 or processor located within the housing of the sensor 506 to determine the torque measurement.

The sensor 506 is fixed to a static structure, such as the frame 14a of the electrical bicycle 14 (FIG. 1) so as to be stationary relative to the shaft 730. The sensor 506 is coupled to the frame 14a such that the sensor probes 506a, 506b are aligned with the gap 714. The sensor 506 may be in communication with a control module and/or a monitoring module associated with the electrical bicycle 14 over a suitable architecture that permits the transfer of power and/or data, such as a bus, to provide the sensor signals from the sensor probes 506a, 506b and/or the torque measurement to be used for controlling an aspect of the electrical bicycle 14, such providing an electrical motion assistance to the user that is proportional to the effort generated by the user of the electrical bicycle 14.

As the assembly of the torque measurement system 700 is substantially similar to the assembly of the torque measurement system 10 discussed with regard to FIGS. 1-2, the assembly of the torque measurement system 700 will not be discussed in great detail herein. As the shaft 730 rotates, the sensor probes 506a, 506b observe the magnetic field associated with the single pole magnet 718. The sensor probes 506a, 506b generate sensor signals based on the observation. As a torque is applied to the shaft 730, the second end 710 of the first housing portion 702 rotates relative to the second housing portion 704, which results in a shift in the periodic magnetic field observed by the sensor probe 506a as compared to the periodic magnetic field observed by the sensor probe 506b. The shift in the magnetic field observed by the sensor probe 506a results in a shift in the periodic signal generated by the sensor probe 506a as compared to the periodic signal generated by the sensor probe 506b. The module 524 interprets the sensor signals or sensor data from the sensor probes 506a, 506b of the sensor 506 and determines the phase shift. Based on the determined phase shift, the module 524 may access the look up table and determine the torque measurement based on the determined phase shift 526.

Figure 13:
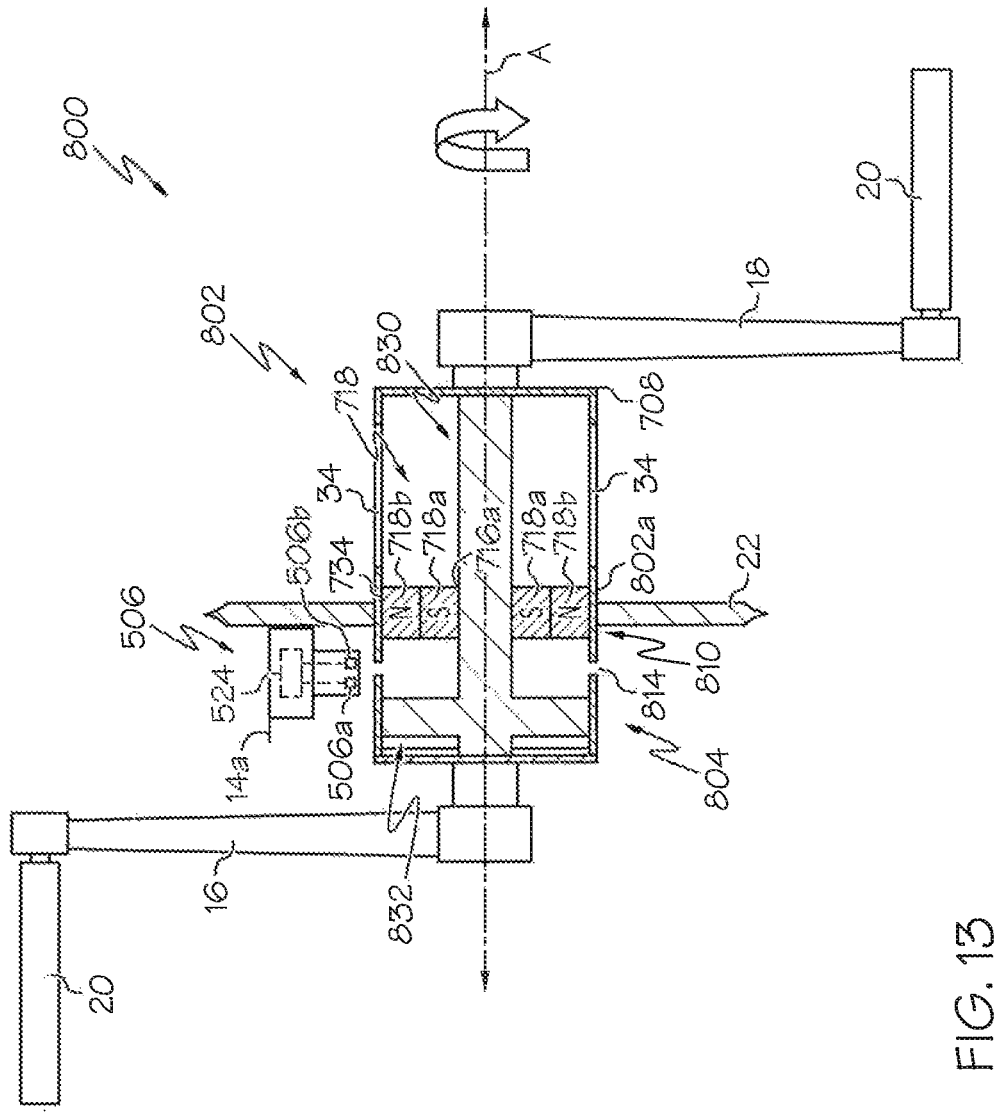
FIG. 13 is a schematic partial cross-sectional illustration of a torque measurement system for use with a rotating shaft, such as a crank shaft of an electrical bicycle, in accordance with various embodiments.

With reference now to FIG. 13, a schematic partially cross-sectional illustration of a torque measurement system 800 is shown. As the torque measurement system 800 can be similar to the torque measurement system 700 discussed with regard to FIGS. 11-12, only the differences between the torque measurement system 800 and the torque measurement system 700 will be discussed in detail herein, with the same reference numerals used to denote the same or substantially similar components. The torque measurement system 800 is coupled to a shaft 830, which in this example is the pedal crank shaft of an electrical bicycle 14. The shaft 830 is rotatable or configured to rotate upon receipt of an input. The shaft 830 is coupled to the first crank arm 16 and the second crank arm 18 to receive the input from the operator of the electrical bicycle 14. In this example, the shaft 830 includes a radial extension 832. The radial extension 832 is substantially annular, and extends outwardly from the shaft 830 between a first shaft end 830a and a second shaft end 830b. The radial extension 832 may be integrally formed with the shaft 830, or may be coupled to the shaft 830 so as to extend annularly about the shaft 830 through any suitable technique, such as welding. The radial extension 832 may be composed of the same or a different material than the shaft 830. Generally, the radial extension 832 is composed of a ferromagnetic conductive material, such as a metal or a metal alloy. The use of a ferromagnetic conductive material enables a magnetic field generated by the torque measurement system 800 to be directed through the radial extension 832.

The torque measurement system 800 includes a first housing portion 802, a second housing portion 804 and the sensor 506. The first housing portion 802 has the first end 708 and a second end 810. The first housing portion 802 is coaxial with the shaft 830, and in one example, the first housing portion 802 is cylindrical, however, it will be understood that the first housing portion 802 may have any desired shape.

The first end 708 of the first housing portion 802 is coupled to the shaft 830 near the second shaft end 830b of the shaft 830. The first housing portion 802 also includes one or more elastically deformable elements 34. In one example, the one or more elastically deformable elements 34 are integral with or embedded into the first housing portion 802, and may comprise a portion of a sidewall 802a of the first housing portion 802. The elastically deformable elements 34 are configured to deform upon the application of the torque to the shaft 830, thereby resulting in a rotation of the second end 810 of the first housing portion 802. It should be noted that while the first housing portion 802 is illustrated herein as having the substantially solid sidewall 802a between the first end 708 and the second end 810, the first housing portion 802 may include one or more cut-outs, openings or slots to reduce the weight and/or improve the flexibility of the first housing portion 802. Moreover, while the elastically deformable elements 34 are described as being coupled to the first housing portion 802, the torque measurement system 800 may alternatively include the shaft 102 having the elastically deformable elements 110 described with regard to FIG. 3 instead of the elastically deformable elements 34 coupled to the first housing portion 802.

The second end 810 of the first housing portion 808 is adjacent to the first shaft end 830a of the shaft 830. The second end 810 is generally circumferentially open, and the second end 810 is not coupled to the first shaft end 830a. Thus, only the first end 708 of the first housing portion 802 is coupled to the shaft 830, and the second end 810 is free. The second end 810 includes the single pole magnet 718, which is generally a permanent magnet. The single pole magnet 718 generates a magnetic field, which propagates through the radial extension 832. It should be noted that while the single pole magnet 718 is illustrated herein as being part of the first housing portion 802, the single pole magnet 718 may also be located on the shaft 830. The single pole magnet 718 generally comprises a south pole 718a near a bore 718c, and a north pole 718b near a perimeter or circumference of the body 716. Generally, the single pole magnet 718 is coupled to the second end 810 at the perimeter or circumference of the single pole magnet 718, and the bore 718c is sized to enable the shaft 830 to rotate without contacting the single pole magnet 718.

The second housing portion 804 is spaced apart from the second end 810 of the first housing portion 802 by a gap 814, which comprises an air gap. The gap 814 enables movement of the second end 810 of the first housing portion 802 relative to the second housing portion 804, and is sized to cooperate with the sensor 506. The second housing portion 804 is generally annular, and is coupled to the shaft 830 near the second shaft end 830b of the shaft 830. The second housing portion 804 is fixedly coupled about the shaft 830, via welding, for example, such that the second housing portion 804 rotates with the shaft 830. The second housing portion 804 has a diameter, which may be substantially equal to a diameter of the first housing portion 802 and is sized to receive the radial extension 832 of the shaft 830. Generally, the radial extension 832 is received within the second housing portion 804 to be rotatable with the shaft 830.

The single pole magnet 718 cooperates with the radial extension 832 to generate a periodic magnetic field pattern. The sensor 506 observes the magnetic field generated by the single pole magnet 718. In this example, the sensor 506 is the magnetic speed sensor, which includes two Hall or magneto resistive speed sensor probes 506a, 506b. The sensor probes 506a, 506b each observe the magnetic field associated with the single pole magnet 718, and generate sensor signals based thereon.

As discussed with regard to FIGS. 11-12, the two sensor probes 506a, 506b of the sensor 506 observe and generate two periodic signals s1 and s2 during the rotation of the shaft 830. As a torque is applied to the shaft 830, the second end 810 rotates or deflects due to the elastically deformable elements 34, and the sensor probe 506a generates a periodic sensor signal, the period of which is shifted compared to the periodic signal generated by the sensor probe 506b when there is a torque applied to the shaft 12. A measure of the phase shift between the two periodic signals s1 and s2 generated by the sensor probes 506a, 506b when a torque is applied to the shaft 830 is a direct measure of the rotational angle shift (generally about positive 4 degrees to about negative 4 degrees) between the second end 810 of the first housing portion 802 and the second housing portion 804, which is directly proportional to the torque applied on the shaft 830. The comparison between the two periodic signals generated by the sensor probes 506a, 506b may be performed by the module 524 or processor located within the housing of the sensor 506 to determine the torque measurement, as discussed with regard to FIG. 6.

As the assembly of the torque measurement system 800 is substantially similar to the assembly of the torque measurement system 10 discussed with regard to FIGS. 1-2, the assembly of the torque measurement system 800 will not be discussed in great detail herein. Moreover, as the operation of the torque measurement system 800 is substantially similar to the operation of the torque measurement system 700 discussed with regard to FIGS. 11-12, the operation of the torque measurement system 800 will not be discussed in great detail herein.

Figure 14:
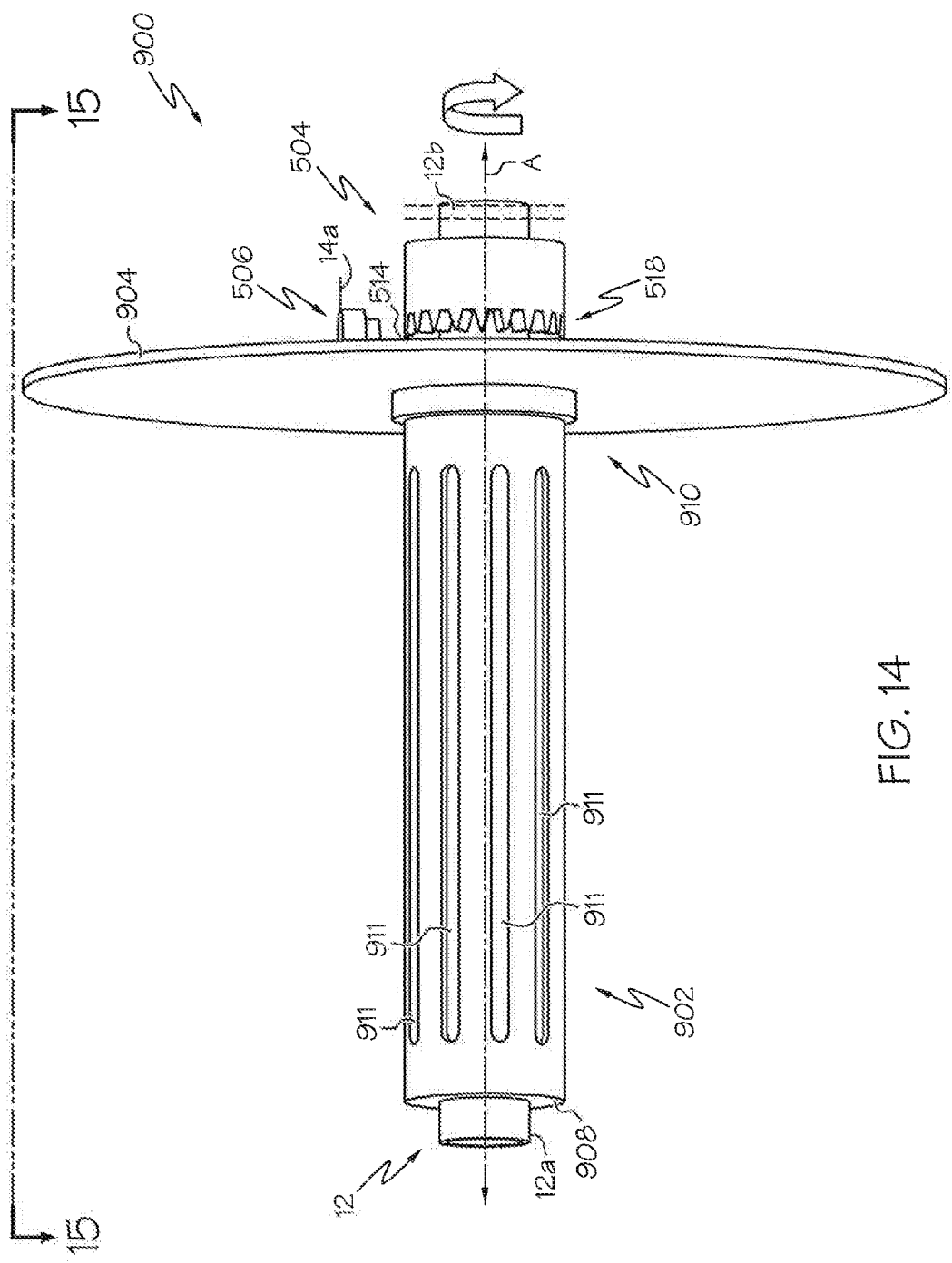
FIG. 14 is a perspective view of a torque measurement system for use with a rotating shaft, such as a crank shaft of an electrical bicycle, in accordance with various embodiments.

With reference now to FIG. 14, a perspective schematic illustration of a torque measurement system 900 is shown. As the torque measurement system 900 can be similar to the torque measurement system 500 discussed with regard to FIG. 6, only the differences between the torque measurement system 500 and the torque measurement system 900 will be discussed in detail herein, with the same reference numerals used to denote the same or substantially similar components. The torque measurement system 900 is coupled to the shaft 12, which in this example is the pedal crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). A chain ring or sprocket 904 is also coupled to the shaft 12 to transmit the torque applied to the shaft 12 to a rear wheel of the electrical bicycle 14, as is known in the art. The torque measurement system 900 includes a first housing portion 902, the second housing portion 504 and the sensor 506.

The first housing portion 902 has a first end 908 and a second end 910. The first housing portion 902 is coaxial with the shaft 12, and in one example, the first housing portion 902 is cylindrical, however, it will be understood that the first housing portion 902 may have any desired shape. The first end 908 of the first housing portion 902 is coupled to the shaft 12 near the first shaft end 12a of the shaft 12. The first end 908 is coupled to the shaft 12 so as to be fixed relative to the shaft 12 for rotation therewith. In one example, the first end 908 is welded to the shaft 12, but the first end 908 may be fixedly coupled to the shaft 12 using any desired technique as known to one skilled in the art. In this example, the first housing portion 902 includes one or more cut-outs, openings or slots 911 to reduce the weight and/or improve the flexibility of the first housing portion 902.

Figure 15:
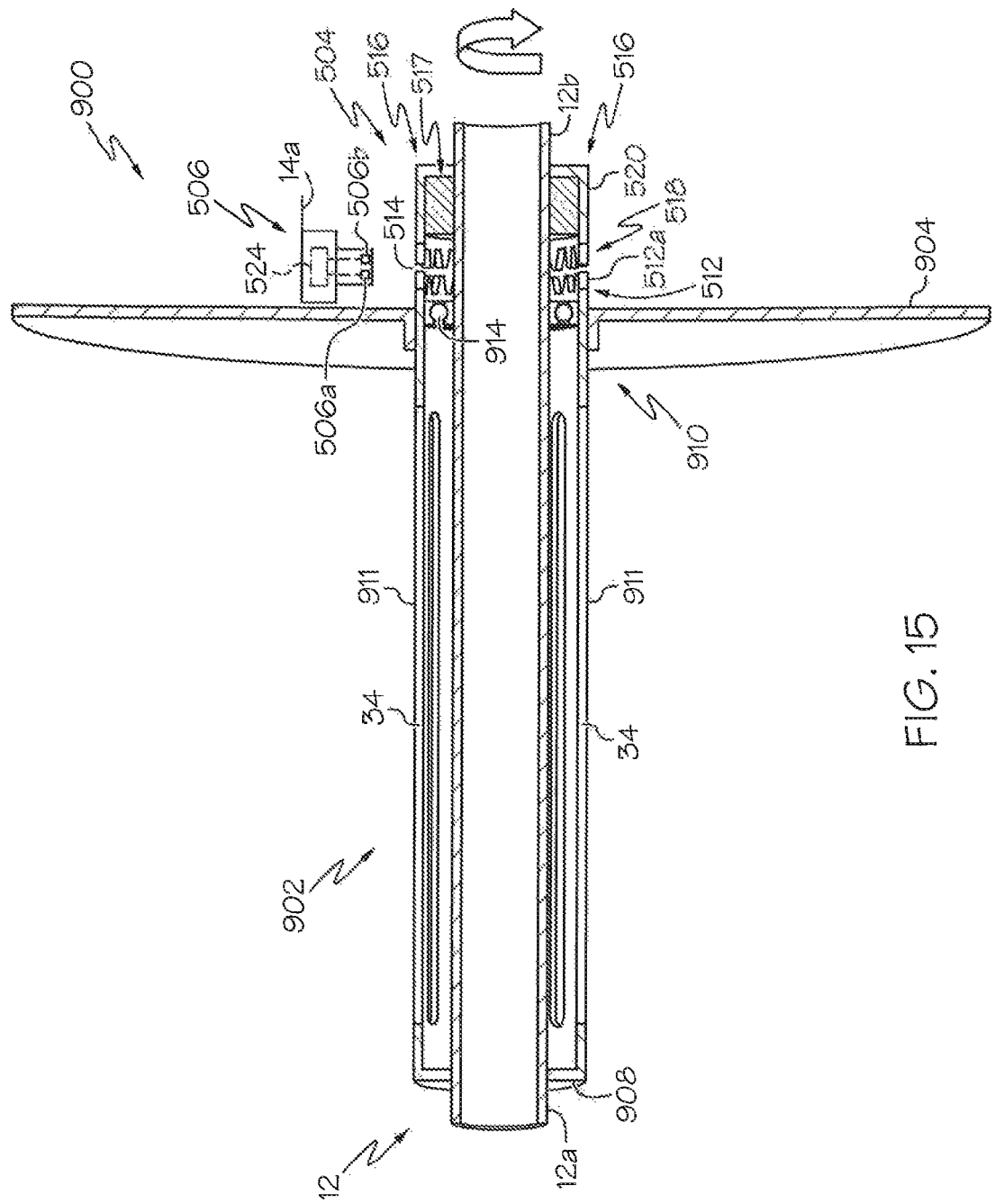
FIG. 15 is a cross-sectional view of the torque measurement system of FIG. 14, taken along line 15-15 of FIG. 14.

With reference to FIG. 15, the first housing portion 902 also includes the one or more elastically deformable elements 34. In one example, the one or more elastically deformable elements 34 are integral with or embedded into the first housing portion 902, and may comprise a portion of a sidewall 902a of the first housing portion 902. The elastically deformable elements 34 are configured to deform upon the application of the torque to the shaft 12, thereby resulting in a rotation of the second end 910 of the first housing portion 902. It should be noted that while the elastically deformable elements 34 are described as being coupled to the first housing portion 902, the torque measurement system 900 may alternatively include the shaft 102 having the elastically deformable elements 110 described with regard to FIG. 3 instead of the elastically deformable elements 34 coupled to the first housing portion 902.

The second end 910 of the first housing portion 902 is adjacent to the second shaft end 12b of the shaft 12. The second end 910 is generally circumferentially open, and the second end 910 is not coupled to the second shaft end 12b. Thus, only the first end 908 of the first housing portion 902 is coupled to the shaft 12, and the second end 910 is free. In this example, the second end 910 of the first housing portion 902 includes the first plurality of teeth 512 and a bearing 914. The first plurality of teeth 512 are coupled to the first housing portion 902 so as to extend about a perimeter or circumference of the second end 910 in a specific, defined periodic shape profile pattern. The first plurality of teeth 512 may be integrally formed with the second end 910, or may be coupled to the second end 910 through a suitable technique, such as welding. The first plurality of teeth 512 are observable by the sensor 506.

The bearing 914 is coupled to the second end 910 near the first plurality of teeth 512. The bearing 914 is coupled to the second end 910 so as to extend about an inner perimeter or inner circumference of the first housing portion 902 at the second end 910. The bearing 914 comprises any suitable bearing or bushing known to one in the art for enabling the shaft 12 to rotate within the first housing portion 902. In one example, the bearing 914 is a ball bearing. The bearing 914 ensures that the torque applied to the rotating shaft 12 is transferred into rotational or angular deflection, by guiding the second end 910 of the first housing portion 902 relative to the rotating shaft 12.

The second housing portion 504 is spaced apart from the second end 510 of the first housing portion 502 by the gap 514, which comprises the air gap. The second housing portion 504 includes the body 516 and the second plurality of teeth 518. The body 516 comprises the single pole magnet 517, which is generally a permanent magnet. The single pole magnet 517 generates the magnetic field B, which propagates through the second plurality of teeth 518 and the first plurality of teeth 512. It should be noted that while the single pole magnet 517 is illustrated herein as being part of the second housing portion 504, the single pole magnet 517 may also be located either on the shaft 12, or on the first housing portion 902.

The single pole magnet 517 cooperates with the first plurality of teeth 512 and the second plurality of teeth 518 to generate a periodic magnetic field pattern between the first plurality of teeth 512 and the second plurality of teeth 518. The sensor 506 is the magnetic speed sensor, which includes two Hall or magneto resistive speed sensor probes 506a, 506b. The sensor probes 506a, 506b each observe the magnetic field associated with the respective one of the first plurality of teeth 512 and the second plurality of teeth 518, and generate sensor signals based thereon.

As discussed with regard to FIG. 6, the two sensor probes 506a, 506b of the sensor 506 observe and generate two periodic signals s1 and s2 during the rotation of the shaft 12. As a torque is applied to the shaft 12, the second end 910 rotates or deflects due to the elastically deformable elements 34, and the sensor probe 506a generates a periodic sensor signal, the period of which is shifted compared to the periodic signal generated by the sensor probe 506b when there is a torque applied to the shaft 12. A measure of the phase shift between the two periodic signals s1 and s2 generated by the sensor probes 506a, 506b when a torque is applied to the shaft 12 is a direct measure of the rotational angle shift (generally about positive 4 degrees to about negative 4 degrees) between the second end 910 of the first housing portion 902 and the second housing portion 504, which is directly proportional to the torque applied on the shaft 12. The comparison between the two signals generated by the sensor probes 506a, 506b may be performed by the module 524 or processor located within the housing of the sensor 506 to determine the torque measurement. The sensor 506 is fixed to a static structure, such as the frame 14a of the electrical bicycle 14 (FIG. 1).

As the assembly of the torque measurement system 900 is substantially similar to the assembly of the torque measurement system 10 discussed with regard to FIGS. 1-2, the assembly of the torque measurement system 900 will not be discussed in great detail herein. Moreover, as the operation of the torque measurement system 900 is substantially similar to the operation of the torque measurement system 500 discussed with regard to FIG. 6, the operation of the torque measurement system 900 will not be discussed in great detail herein. Briefly, however, upon the application of a torque to the rotating shaft 12, the bearing 914 guides or limits the second end 910 of the first housing portion 902 such that the second end 910 experiences angular deflection or displacement relative to the shaft 12.

Figure 16:
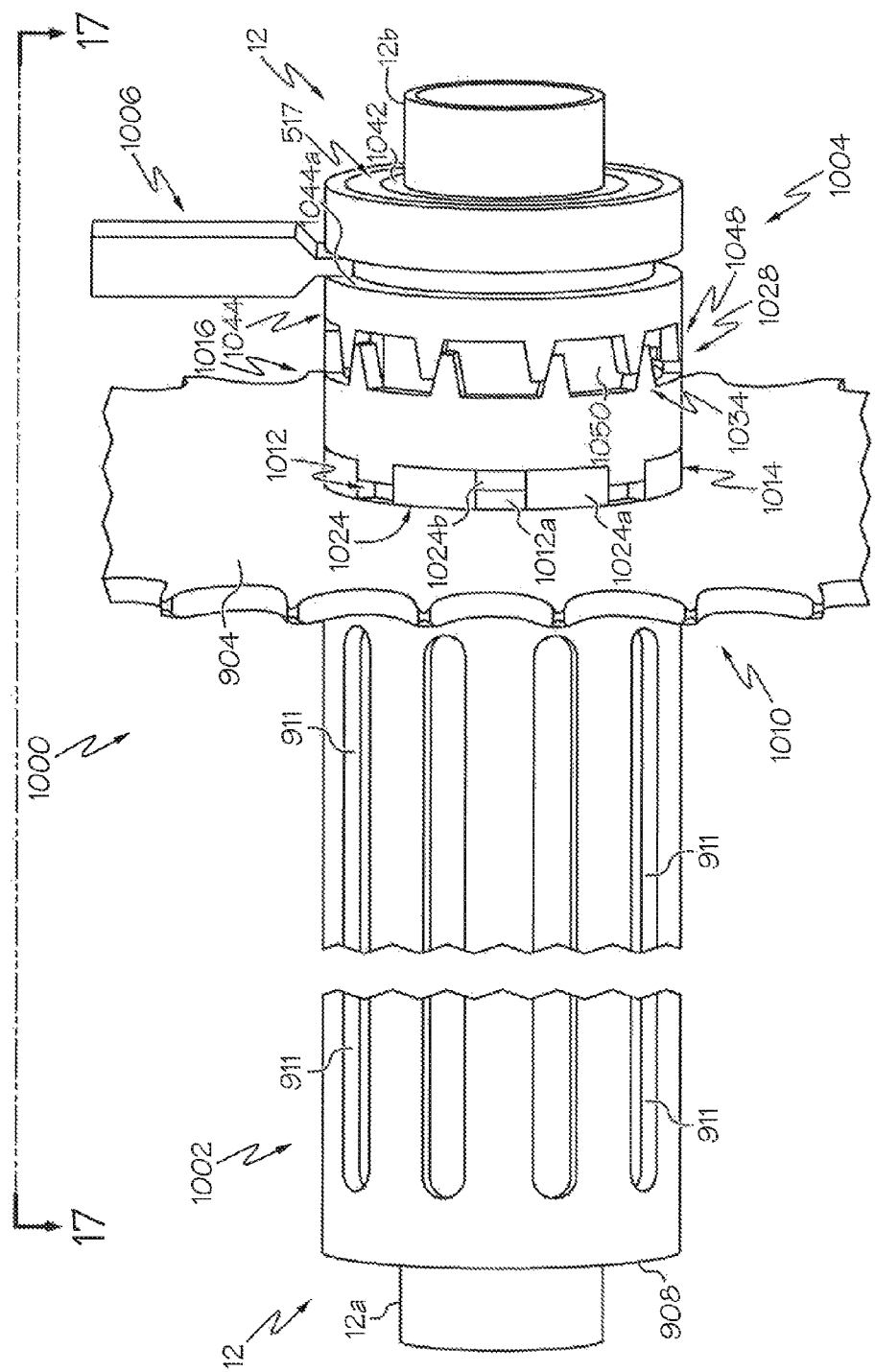
FIG. 16 is a perspective view of a torque measurement system for use with a rotating shaft, such as a crank shaft of an electrical bicycle, in accordance with various embodiments.

With reference now to FIG. 16, a perspective schematic illustration of a torque measurement system 1000 is shown. As the torque measurement system 1000 can be similar to the torque measurement system 900 discussed with regard to FIGS. 14-15, only the differences between the torque measurement system 900 and the torque measurement system 1000 will be discussed in detail herein, with the same reference numerals used to denote the same or substantially similar components. The torque measurement system 1000 is coupled to the shaft 12, which in this example is the pedal crank shaft of the electrical bicycle 14 (FIG. 1). The shaft 12 is rotatable or configured to rotate upon receipt of an input. The shaft 12 is coupled to the first crank arm 16 and the second crank arm 18 to receive the input from the operator of the electrical bicycle 14 (FIG. 1). A chain ring or sprocket 904 is also coupled to the shaft 12 to transmit the torque applied to the shaft 12 to a rear wheel of the electrical bicycle 14, as is known in the art. The torque measurement system 1000 includes a first housing portion 1002, a second housing portion 1004 and a sensor 1006.

The first housing portion 1002 has the first end 908 and a second end 1010. The first housing portion 1002 is coaxial with the shaft 12, and in one example, the first housing portion 1002 is cylindrical, however, it will be understood that the first housing portion 1002 may have any desired shape. The first end 908 of the first housing portion 1002 is coupled to the shaft 12 near the first shaft end 12a of the shaft 12 so as to be fixed relative to the shaft 12 for rotation therewith. The first housing portion 1002 includes the one or more cut-outs, openings or slots 911 to reduce the weight and/or improve the flexibility of the first housing portion 1002.

With reference to FIG. 15, the first housing portion 1002 also includes the one or more elastically deformable elements 34. In one example, the one or more elastically deformable elements 34 are integral with or embedded into the first housing portion 1002, and may comprise a portion of a sidewall 1002a of the first housing portion 1002. The elastically deformable elements 34 are configured to deform upon the application of the torque to the shaft 12, thereby resulting in a rotation of the second end 1010 of the first housing portion 1002. It should be noted that while the elastically deformable elements 34 are described as being coupled to the first housing portion 1002, the torque measurement system 1000 may alternatively include the shaft 102 having the elastically deformable elements 110 described with regard to FIG. 3 instead of the elastically deformable elements 34 coupled to the first housing portion 1002.

The second end 1010 of the first housing portion 1002 is adjacent to the second shaft end 12b of the shaft 12. The second end 1010 is generally circumferentially open, and the second end 1010 is not coupled to the second shaft end 12b, such that the second end 1010 is free. In this example, the second end 1010 of the first housing portion 1002 includes the bearing 914, a plurality of projections 1012, a coupler 1014 and a ring 1016. The plurality of projections 1012 extend in an alternating pattern about a perimeter or circumference of a terminal end 1010a (FIG. 17) of the first housing portion 1002. In one example, the plurality of projections 1012 comprise a plurality of block-shaped protrusions 1012a, which extend outwardly along the longitudinal axis of the first housing portion 1002. Each of the block-shaped protrusions 1012a may extend outwardly from the terminal end 1010a at a different length, to form an interlocking pattern for receipt of a portion of the coupler 1014. In this regard, the plurality of projections 1012 cooperate to receive a portion of the coupler 1014 to couple the coupler 1014 to the second end 1010.

Figure 17:
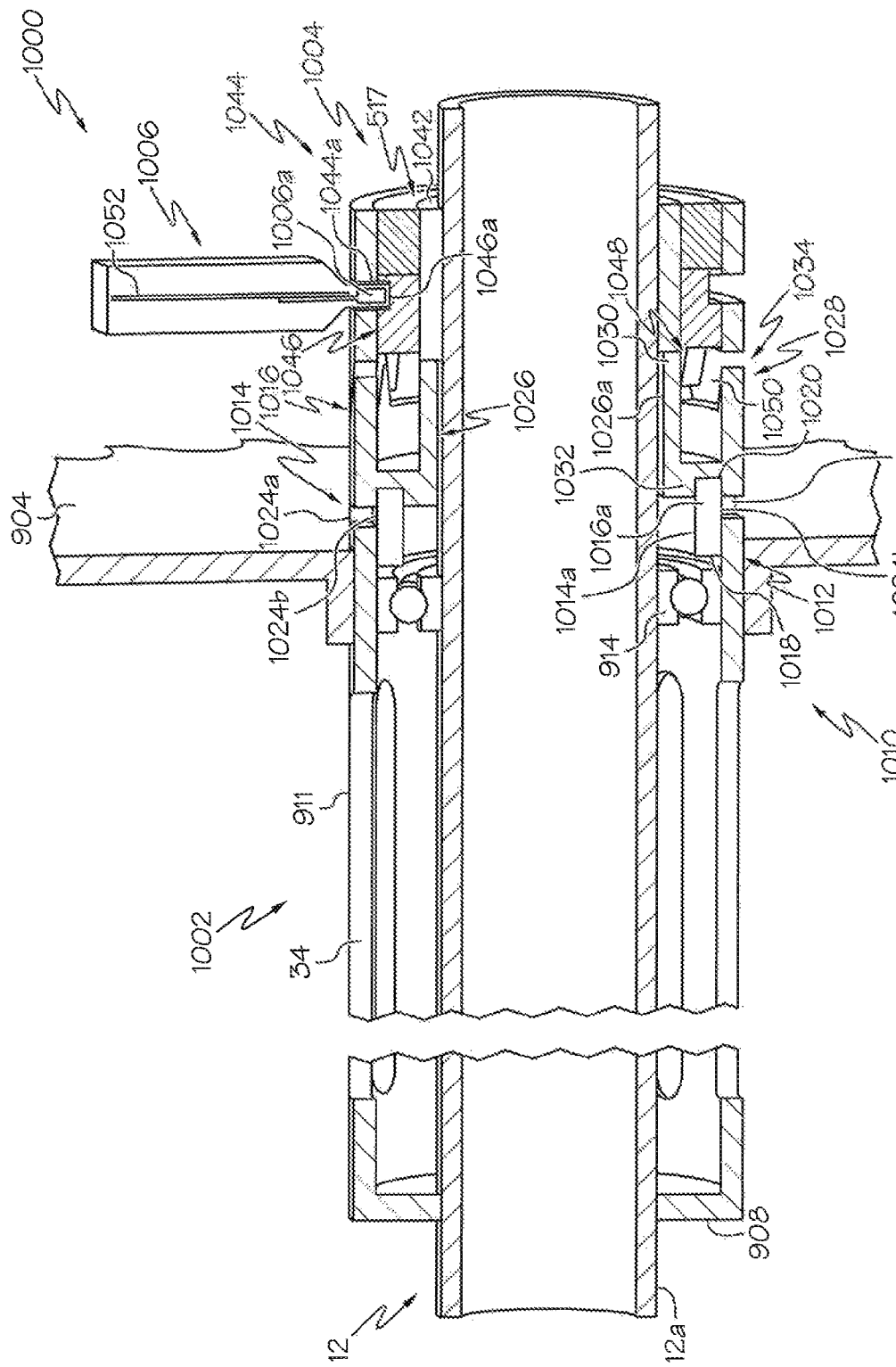
FIG. 17 is a cross-sectional view of the torque measurement system of FIG. 16, taken along line 17-17 of FIG. 16.

The coupler 1014 couples the ring 1016 to the second end 1010 of the first housing portion 1002. The coupler 1014 is composed of a non-magnetically conductive material, such as a polymeric material, to prevent the flow of a magnetic field through the plurality of projections 1012. The coupler 1014 is annular, and defines a central bore 1014a, through which a portion of the rotatable shaft 12 is received. Generally, the coupler 1014 has a diameter sized such that the coupler 1014 does not contact the rotatable shaft 12. With reference to FIGS. 16-17, the coupler 1014 includes a first end 1018, a second end 1020 and an exterior perimeter or circumference 1022 (FIG. 16).

The first end 1018 is coupled to the second end 1010 of the first housing portion 1002. The first end 1018 is generally connected to the first housing portion 1002 so as to be received within an inner perimeter at the second end 1010. The second end 1020 is coupled to the ring 1016. The second end 1020 is generally connected to the ring 1016 so as to be received in a slot 1016a defined in the ring 1016. The exterior circumference 1022 of the coupler 1014 includes a plurality of alternating raised portions 1024. Between each portion 1024a of the plurality of alternating raised portions 1024 is a recess 1024b. The plurality of alternating raised portions 1024 and the associated recesses 1024b cooperate to receive the plurality of projections 1012 and a portion of the ring 1016 to couple the coupler 1014 between the terminal end 1010*a* and the ring 1016. Generally, the coupler 1014 is coupled between the terminal end 1010*a* and the ring 1016 via a press-fit or interference-fit, however, the coupler 1014 may be coupled through any suitable technique, such as ultrasonic welding, adhesives, etc.

The ring 1016 is mechanically coupled to the coupler 1014, and is magnetically coupled to the second housing portion 1004. The ring 1016 is comprised of a ferromagnetic conductive material. The ring 1016 includes a substantially U-shaped body 1026, which defines a central bore 1026*a* through which a portion of the rotatable shaft 12 passes there through. Generally, the central bore 1026*a* is sized such that the ring 1016 is spaced apart from, and does not contact, the portion of the rotatable shaft 12 that passes through the central bore 1026*a*. The body 1026 includes a first flange 1028, a second flange 1030 and a base 1032, which interconnects the first flange 1028 and the second flange 1030.

The first flange 1028 extends along the longitudinal axis of the first housing portion 1002, and defines a plurality of teeth 1034 at a first flange end. The plurality of teeth 1034 are spaced apart along a perimeter of the first flange 1028. The first flange 1028 is coupled to the base 1032 at a second flange end. The second flange end is opposite the first flange end that comprises the plurality of teeth 1034. The second flange 1030 extends along the longitudinal axis of the first housing portion 1002, and generally extends for a length greater than a length of the first flange 1028. The second flange 1030 defines the central bore 1026*a*, and is generally adjacent to the portion of the rotatable shaft 12. The base 1032 defines the slot 1016*a*, which receives the second end 1020 of the coupler 1014. The slot 1016*a* need not extend entirely about the circumference of the ring 1016, but rather, the ring 1016 may define a plurality of slots 1016*a*, such that the coupler 1014 is connected to the ring 1016 in an interlocking manner (FIG. 16).

The second housing portion 1004 is spaced apart from the second end 1010 of the first housing portion 1002 by the gap 1040. The second housing portion 1004 includes an inner ring 1042, an outer ring 1044, a support 1046 and the single pole magnet 517, which is generally a permanent magnet. The single pole magnet 517 generates the magnetic field B, which propagates through the outer ring 1044, a slot 1044*a* of the outer ring 1044, a second plurality of teeth 1048, the plurality of teeth 1034, the ring 1016 and the inner ring 1042. It should be noted that while the single pole magnet 517 is illustrated herein as being part of the second housing portion 1004, the single pole magnet 517 may also be located on ring 1016.

The inner ring 1042 is fixedly coupled to the shaft 12, near the second shaft end 12*b*. The outer ring 1044 comprises an exterior surface of the second housing portion 1004, and defines the slot 1044*a* substantially about an entirety of a perimeter or circumference of the outer ring 1044 for receipt of a portion of the sensor 1006. The outer ring 1044 also comprises the second plurality of teeth 1048. The second plurality of teeth 1048 are defined about a perimeter or circumference of the outer ring 1044 so as to extend towards and may or may not be in contact with the plurality of teeth 1034 of the first flange 1028 when no torque is applied to the shaft 12. In this regard, a respective one of the plurality of teeth 1034 contacts a respective one of the second plurality of teeth 1048 to enable the magnetic field generated by the single pole magnet 517 to flow or propagate through the second plurality of teeth 1048 and the first plurality of teeth 1034 when the shaft 12 is not subject to a torque. When the shaft 12 is subject to a torque, the plurality of teeth 1034 move or shift relative to the second plurality of teeth 1048 into an air gap 1050, which reduces the amount of the magnetic field transmitted from the second housing portion 1004 to the ring 1016. The sensor 1006 observes these changes in the magnetic field and generates sensor signals based on the observations.

The single pole magnet 517 and the support 1046 are coupled to the inner ring 1042 and the outer ring 1044 so as to be positioned between the inner ring 1042 and the outer ring 1044. The support 1046 defines a slot 1046*a* for receipt of at least one sensor probe 1006*a* of the sensor 1006. The single pole magnet 517 cooperates with the outer ring 1044, the slot 1044*a*, the plurality of teeth 1034 and the second plurality of teeth 1048 to direct the magnetic field generated by the single pole magnet 517 through the second plurality of teeth 1048, through the plurality of teeth 1034 and back through the ring 1016 to be observed by the sensor 1006. The support 1046 comprises any suitable non magnetically conductive material, such as a polymeric material.

The sensor 1006 observes the magnetic field that flows through the outer ring 1044, the slot 1044*a*, the second plurality of teeth 1048, the plurality of teeth 1034, the ring 1016 and the inner ring 1042. The sensor 1006 generates sensor signals based on the observed changes in the magnetic field. The changes in the strength of the magnetic field observed by the sensor 1006 correspond to the torque applied or acting on the shaft 12. The sensor 1006 contains the sensor probe 1006*a*, and is fixed to a static structure, such as the frame 14*a* of the electrical bicycle 14 (FIG. 1). The sensor 1006 is coupled to the frame 14*a* such that the sensor probe 1006*a* is located within the slot 1046*a* of the ferromagnetic conductor 1046. The sensor probe 1006*a* of the sensor 1006 observes and detects the strength of the magnetic field as it returns through the ring 1016 to the single pole magnet 517 and detects a variation in this field strength when a torque is applied to the shaft 12. A module 1052 or processor associated with the sensor 1006 interprets the sensor signals or sensor data from the sensor 1006 and determines a torque measurement based on the sensor data, by accessing a look-up calibration table, for example. In one example, the module 1052 accesses the look up table, which may be stored in a datastore in communication with the module 1052 or in a memory associated with the module 1052, and determines the torque measurement based on the determined magnetic field strength.

The sensor 1006 may be in communication with a control module and/or a monitoring module associated with the electrical bicycle 14 over a suitable architecture that permits the transfer of power and/or data, such as a bus, to provide the sensor signals to be used for controlling an aspect of the electrical bicycle 14, such as providing an electrical motion assistance to the user that is proportional to the effort generated by the user of the electrical bicycle 14. The sensor 1006 may also be in communication with a display device associated with the electrical bicycle 14, over a suitable architecture that permits the transfer of power and/or data, such as a bus, to present the sensor data associated with the observed torque.

As the assembly of the torque measurement system 1000 is substantially similar to the assembly of the torque measurement system 10 discussed with regard to FIGS. 1-2, the assembly of the torque measurement system 1000 will not be discussed in great detail herein. As the shaft 12 rotates, the sensor probe 1006*a* observes the magnetic field B as the magnetic field B flows through the outer ring 1044, the slot 1044*a*, the second plurality of teeth 1048, the plurality of teeth 1034, the ring 1016 and the inner ring 1042. The sensor probe 1006*a* generates sensor signals based on the observation. As a torque is applied to the shaft 12, the second end 1010 of the first housing portion 1002 rotates relative to the second housing portion 1004, which results in a shift in the plurality of teeth 1034 relative to the second plurality of teeth 1048. Stated another way, the application of a torque to the shaft 12 causes the second end 1010 of the first housing portion 1002 to rotate or twist, thereby moving each of the plurality of teeth 1034 away from the respective ones of the second plurality of teeth 1048 and creating an increasing air gap between the plurality of teeth 1034 and the second plurality of teeth 1048. This movement of the plurality of teeth 1034 relative to the second plurality of teeth 1048 into the air gap 1050 reduces a strength of the magnetic field that flows from the second plurality of teeth 1048 into the plurality of teeth 1034, and thus, the magnetic field that flows through the ring 1016 and is observed by the sensor 1006. The sensor probe 1006a observes this change or reduction in the strength of the magnetic field, and generates sensor signals based thereon. The module 1052 interprets the sensor signals or sensor data from the sensor probe 1006a of the sensor 1006 and may access the look up table to determine the torque measurement based on the determined magnetic field strength. The torque acting on the shaft 12 corresponds to the change of the strength of the magnetic field observed by the sensor probe 1006a.

It should be noted that the first housing portions 24, 104, 302, 402, 502, 602, 702, 802, 902, 1002 may be comprised of any suitable material, such as a metal, metal alloy or polymer, including fiber reinforced composite materials. The second housing portions 26, 304, 404, 504, 604, 704, 804, 1004 may be comprised of any suitable material, such as a metal, metal alloy or polymer, including fiber reinforced composite materials.

A torque sensor architecture for detecting a torque on a rotating shaft is provided. The torque sensor architecture includes a rotating shaft upon which the torque acts, a radial extending protuberance located on one side of the rotating shaft, a mechanical part having the shape type of a coaxial cylinder and being coaxial with the rotating shaft and being mechanically linked to the rotating shaft into only one extremity and having the other free extremity of the coaxial cylinder located close to the radial extending protuberance of the rotating shaft, at least one dedicated elastically deformable mechanical elements embedded on the rotating shaft and or on the coaxial cylinder, at least one sensor located on a static frame in a location area that is above or inside the area located between the free extremity of the coaxial cylinder and the radial extending protuberance and containing at least one sensing probe. The dedicated elastically deformable mechanical elements will generate a rotational angle shift between the free extremity of the coaxial cylinder and the radial extending protuberance, and this rotational angle shift is proportional to the torque applied on the rotating shaft and wherein the sensor detects directly or indirectly the rotational angle shift induced by the torque applied on the rotating shaft.

The torque sensor architecture in which the area of location of the dedicated elastically deformable mechanical elements are embedded only on the rotating shaft, and this particular geometry allow the detection of the torque generated between the two extremities of the rotating shaft.

The torque sensor architecture in which the area of location of the dedicated elastically deformable mechanical elements are embedded only on the coaxial cylinder, wherein this particular geometry allows the detection of the torque generated on both extremities of the rotating shaft and transmitted to the free extremity of the coaxial cylinder.

The torque sensor architecture in which the free extremity of the coaxial cylinder, or the radial extending protuberance or both of them includes circular rotating sensing targets to be detected by the sensor and generate at least one signal during the rotation of the shaft to allow the measurement of the torque applied to the rotating shaft.

The torque sensor architecture in which the rotating target are multipole ring magnet targets to generate at least one rotating periodic magnetic field pattern. The torque sensor architecture in which the rotating target consist of specific periodic teeth pattern. The torque sensor architecture in which the rotating target consist of the conjunction of at least one single pole magnet and of at least one specific periodic teeth pattern to generate at least one rotating periodic magnetic field pattern.

The torque sensor architecture in which one multipole ring magnet is located at the free extremity of the coaxial cylinder and one multipole ring magnet is located on the radial extending protuberance of the rotating shaft. The torque sensor architecture in which one of the specific periodic teeth pattern is located at the free extremity of the coaxial cylinder and one of the of specific periodic teeth patterns located on the radial extending protuberance of the rotating shaft.

The torque sensor architecture in which at least one radial or axial single pole magnet is embedded either into the radial extending protuberance of the rotating shaft, or embedded into the rotating shaft, or embedded into the free extremity of the coaxial cylinder in order to create a magnetic flux geometry coaxial to the axis of the rotating shaft, wherein this coaxial magnetic flux geometry is passing through the radial extending protuberance of the rotating shaft and the free extremity of the coaxial cylinder and through the air gap located between the free extremity of the coaxial cylinder and the radial extending protuberance of the rotating shaft.

The torque sensor architecture in which one radial single pole magnet is embedded in the free extremity of the coaxial cylinder in order to create a magnetic flux geometry coaxial to the axis of the rotating shaft, wherein this coaxial magnetic flux geometry is passing through the radial extending protuberance of the rotating shaft and through the free extremity of the coaxial cylinder and through the air gap located between the free extremity of the coaxial cylinder and the radial extending protuberance of the rotating shaft.

The torque sensor architecture in which one coaxial radial ferromagnetic conductive part is embedded into the free extremity of the coaxial cylinder in to shorten the length of the loop of the magnetic lines and to reduce the magnetic loses, wherein this additional coaxial ferromagnetic conductive part is not mechanically fixed to both the inner diameter of the coaxial cylinder and outer diameter of the rotating shaft to allow the generation of a rotational angle shift between the free extremity of the coaxial cylinder and the radial extending protuberance when is proportional to the torque applied on the rotating shaft.

The torque sensor architecture in which both the free extremity of the coaxial cylinder and the extending protuberance of the rotating shaft contain a periodic shape profile, wherein this periodic shape profile geometry concentrates the emission and the reception of the magnetic line within the air gap at the extremity of each shape and creates a periodic specific magnetic field pattern in the air gap located between the free extremity of the coaxial cylinder and the radial extending protuberance of the rotating shaft.

The torque sensor architecture in which the sensor includes at least two sensor probes based on magnetic hall technology or magneto resistance technology that generate at least two periodic speed sensor signal when the rotating shaft is rotating.

The torque sensor architecture in which the sensor includes at least two sensor probes based on either back biased magnetic hall or magneto resistance technology or inductive technology or optical technology that generate at least two periodic speed sensor signal when the rotating shaft is rotating.

The torque sensor architecture in which the sensor includes at least one sensor probe based on magnetic hall technology or magneto resistance technology that generates at least one signal representative of the angular direction of the rotating magnetic field pattern when the rotating shaft is rotating.

The torque sensor architecture in which the measure of the phase shift between the two periodic speed sensor signals is a direct measure of the rotational angle shift between the free extremity of the coaxial cylinder and a direct measure of the torque that is apply on the rotating shaft.

The torque sensor architecture in which the measure of the signal representative of the angular direction of the rotating magnetic field pattern when the rotating shaft is rotating is a direct measure of the rotational angle shift between the free extremity of the coaxial cylinder and a direct measure of the torque that is applied on the rotating shaft.

The torque sensor architecture in which a bearing is implemented between the coaxial cylinder and the rotating shaft close to the free extremity of the coaxial cylinder to mechanically strength the geometry of the torque sensor overall architecture.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A torque measurement system for measuring a torque acting on a rotatable shaft that is configured to rotate about an axis upon receipt of an input, the torque measurement system comprising:

a first housing portion having a first end adapted to be fixedly coupled to the rotatable shaft and a second end, the first housing portion adapted to be positioned coaxial with the rotatable shaft;

a second housing portion having a first end spaced apart from the second end of the first housing portion so as to define a gap between the first housing portion and the second housing portion, the second housing portion adapted to be fixedly coupled to the rotatable shaft;

a sprocket coupled to the second end of the first housing portion, wherein the first housing portion is configured to transmit a torque applied to the rotatable shaft to the sprocket;

at least one dedicated elastically deformable mechanical element embedded on the rotatable shaft, the first housing portion, or both, wherein a second end of the first housing portion is configured to be displaced relative to the first end upon transmission of the torque from the rotatable shaft to the sprocket; and at least one sensor that observes at least one of the second end of the first housing portion, the first end of the second housing portion and the gap and generates sensor signals based on the observation, the sensor signals indicative of a torque acting on the rotatable shaft, the sensor adapted to be fixedly coupled to a static frame.

2. The torque measurement system of claim 1, wherein the first housing portion includes at least one elastically deformable element between the first end and the second end of the first housing portion.

3. The torque measurement system of claim 1, wherein the second end of the first housing portion includes a first periodic shape profile, and the first end of the second housing portion includes a second periodic shape profile.

4. The torque measurement system of claim 3, wherein the first end of the second housing portion includes a single pole magnet, the second periodic shape profile is mechanically coupled about a perimeter of the single pole magnet and the first periodic shape profile is composed of a ferromagnetic conductive material such that a magnetic field generated by the single pole magnet propagates through the second periodic shape profile and the first periodic shape profile.

5. The torque measurement system of claim 1, further comprising the rotatable shaft, wherein the rotatable shaft comprises at least one elastically deformable element between a first end and a second end of the rotatable shaft.

6. The torque measurement system of claim 1, wherein the second end of the first housing portion includes a first multipole magnet, and the first end of the second housing portion includes a second multipole magnet.

7. The torque measurement system of claim 1, wherein the sensor comprises a first sensor probe that observes the second end of the first housing portion and generates a first periodic signal based on the observation and a second sensor probe that observes the first end of the second housing portion and generates a second periodic signal based on the observation, and a phase shift between the first periodic signal and the second periodic signal indicates the torque acting on the rotatable shaft.

8. The torque measurement system of claim 1, wherein the sensor comprises at least one sensor probe that observes the at least one of the second end of the first housing portion, the first end of the second housing portion and the gap, and generates sensor signals based on the observation that indicate an angular deflection of the second end of the first housing portion relative to the second housing portion, and the angular deflection indicates the torque acting on the rotatable shaft.

9. The torque measurement system of claim 1, wherein the second housing portion includes a single pole magnet that generates a magnetic field and the sensor comprises at least one sensor probe that observes a strength of the magnetic field and generates sensor signals based on the observation, and a change in the strength of the magnetic field indicates the torque acting on the rotatable shaft.

10. The torque measurement system of claim 1, wherein the second end of the first housing portion includes a ferromagnetic conductive material, the second housing portion includes a single pole magnet that generates a magnetic field that propagates through a path defined by the second housing portion and the ferromagnetic conductive material of the second end of the first housing portion, and the sensor comprises at least one sensor probe that observes an angular orientation of the magnetic field and generates sensor signals based on the observation, with a change in the angular orientation of the magnetic field indicating the torque acting on the rotatable shaft or the sensor comprises at least one sensor probe that observes a strength of the magnetic field and generates sensor signals based on the observation, with a change in the strength of the magnetic field indicating the torque acting on the rotatable shaft.

11. The torque measurement system of claim 1, further comprising the rotatable shaft, wherein the rotatable shaft is a pedal crank shaft of an electrical bicycle.

12. A method of measuring a torque on a rotatable shaft that is configured to rotate about an axis upon receipt of an input, the method comprising:
coupling a first housing portion coaxially about the rotatable shaft, such that a first end of the first housing portion is fixedly coupled to the rotatable shaft and a second end is free, wherein a sprocket is coupled to the second end of the first housing portion, wherein the first housing portion is configured to transmit a torque applied to the rotatable shaft to the sprocket, wherein at least one dedicated elastically deformable mechanical element is embedded on the rotatable shaft, the first housing portion, or both;
coupling a second housing portion fixedly to the rotatable shaft such that the second end of the first housing portion is spaced apart from the second housing portion by a gap; and
positioning a sensor adjacent to the gap, wherein the sensor is coupled to a module, wherein the first housing portion and the second housing portion are configured so that the second end of the first housing portion is displaced relative to the second housing portion upon transmission of the torque from the rotatable shaft to the sprocket, wherein the sensor is configured to observe at least one of the second end of the first housing portion, the second housing portion and the gap with the sensor, and wherein the sensor is further configured to generate sensor signals based on the observation, the sensor signals indicative of a torque acting on the rotatable shaft.

13. The method of claim 12, further comprising:
providing the second end of the first housing portion with a ferromagnetic conductive material; and
propagating a magnetic field through the first housing portion and the second housing portion via a permanent magnet coupled to the second housing portion, wherein the sensor is further configured to: observe the magnetic field and generate the sensor signals based on the observation of the magnetic field.

14. The method of claim 13, wherein the sensor is further configured to:
observe a strength of the magnetic field with the sensor, observe an angular orientation of the magnetic field with the sensor, or observe a shift in the magnetic field with the sensor.

15. The method of claim 12, wherein the sensor is further configured to:
observe an angular deflection of the second end of the first housing portion relative to the first end of the second housing portion.

16. A method comprising:
applying a torque to a rotatable shaft, wherein the rotatable shaft is configured to rotate about an axis upon receipt of the torque, wherein a first housing portion is coaxially coupled about the rotatable shaft, wherein a first end of the first housing portion is fixedly coupled to the rotatable shaft and a second end of the first housing portion is free, wherein a sprocket is coupled to the second end of the first housing portion, wherein a second housing portion is fixedly coupled to the rotatable shaft, wherein the second end of the first housing portion is spaced apart from the second housing portion by a gap;
transmitting the torque applied to the rotatable shaft to the sprocket through the first housing portion, wherein at least one dedicated elastically deformable mechanical element is embedded on the rotatable shaft, the first housing portion, or both;
displacing the second end of the first housing portion relative to the second housing portion upon transmission of the torque from the rotatable shaft to the sprocket based, at least in part, on the deformation of the dedicated elastically deformable mechanical element;
observing at least one of the second end of the first housing portion, the second housing portion, or the gap with a sensor to observe the displacement of the second end relative to the second housing portion; and
generating sensor signals based on the observing, wherein the sensor signals are indicative of the torque acting on the rotatable shaft.

17. The method of claim 16, further comprising:
propagating a magnetic field through the first housing portion and the second housing portion via a magnet coupled to at least one of the first housing portion, the second housing portion, or the shaft;
observing the magnetic field with the sensor; and
generating the sensor signals based on the observation of the magnetic field.

18. The method of claim 17, wherein observing the magnetic field further comprises:
observing at least one of a strength of the magnetic field with the sensor, an angular orientation of the magnetic field with the sensor, or a shift in the magnetic field with the sensor.

19. The method of claim 16, further comprising:
observing an angular deflection of the second end of the first housing portion relative to the second housing portion.

20. The method of claim 16, wherein a deformable element is disposed in the first housing portion.

* * * * *